(12) United States Patent
Sengupta et al.

(10) Patent No.: US 6,442,512 B1
(45) Date of Patent: Aug. 27, 2002

(54) INTERACTIVE PROCESS MODELING SYSTEM

(75) Inventors: Partha Sengupta, Cypress, TX (US); Joseph W. Kovach, III, Placentia, CA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 09/193,434

(22) Filed: Nov. 17, 1998

Related U.S. Application Data
(60) Provisional application No. 60/105,763, filed on Oct. 26, 1998.

(51) Int. Cl.[7] ............................................. G06F 9/455
(52) U.S. Cl. ................................. 703/6; 703/2; 345/744
(58) Field of Search .................... 703/2, 22, 6; 345/744

(56) References Cited

U.S. PATENT DOCUMENTS

| | | | |
|---|---|---|---|
| 4,736,320 A | 4/1988 | Bristol | 717/3 |
| 4,740,349 A | 4/1988 | Loftus et al. | 376/216 |
| 4,965,742 A | 10/1990 | Skeirik | 700/86 |
| 5,079,731 A | 1/1992 | Miller et al. | 703/6 |
| 5,233,688 A | 8/1993 | Too | 345/440 |
| 5,251,125 A | 10/1993 | Karnowski et al. | 700/84 |
| 5,251,285 A | 10/1993 | Inoue et al. | 706/10 |
| 5,253,186 A | 10/1993 | Lipner et al. | 702/182 |
| 5,265,035 A | 11/1993 | Reifman et al. | 702/185 |
| 5,392,207 A | 2/1995 | Wilson et al. | 700/64 |
| 5,444,837 A | 8/1995 | Bomans et al. | 345/440 |
| 5,452,238 A | 9/1995 | Kramer et al. | 703/1 |
| 5,481,668 A | 1/1996 | Marcus | 345/349 |
| 5,485,620 A | 1/1996 | Sadre et al. | 717/10 |
| 5,499,188 A | 3/1996 | Kline, Jr. et al. | 700/106 |
| 5,548,682 A | 8/1996 | Umeda et al. | 706/62 |
| 5,594,858 A | 1/1997 | Blevins | 345/326 |
| 5,596,704 A | 1/1997 | Geddes et al. | 345/326 |
| 5,611,059 A | 3/1997 | Benton et al. | 345/326 |

(List continued on next page.)

OTHER PUBLICATIONS

Chavez–Mercado et al., C. The Classroom Analysis Simulator: A Training and Research Tool for Nuclear Power Plant Operations, Proceedings of the 1997 IEEE Sixth Conference on Human Factors and Power Plants, 1997, Global Perspectives of Human Factor Genera.*

Yoon et al., Myung–Hyun Design of On–Line Auto–Tuning PID Controller for Power Plant Process Control, SICE '97, Proceedings of the 36th SICE Annual Conference, pp. 1221–1224.*

Jensen, et al., "A Computer Aided System for Generation of Problem Specific Process Models", *Computer chem. Engng*, vol. 20, Suppl. pp. S145–S150, 1996.

Lin, et al., "Structural Approach to the Synthesis of Control Systems", *Trans IChemE*, vol. 72, Part A, pp. 26–37, Jan. 1994.

Fraga, et al., "CHiPS: A Process Synthesis Package", *Trans IChmE*, vol. 72, Part A, pp. 389–394, May 1994.

(List continued on next page.)

*Primary Examiner*—Russell Frejd
(74) *Attorney, Agent, or Firm*—Cooley Godward LLP; Kevin J. Zimmer

(57) ABSTRACT

A software plant process modeling system creates a process flowsheet model. The software system creates at least a first unit model as part of the process flowsheet model. The software system displays at least one equation in the first unit model. The software system permits a user to display at least one equation in the first unit model. The software system further permits the user to modify the first unit model. The software system generates an open-equation model to solve the process flowsheet. Thus, a user may interactively create, modify, and solve a process flowsheet model in open-form.

29 Claims, 19 Drawing Sheets

U.S. PATENT DOCUMENTS

| | | | | |
|---|---|---|---|---|
| 5,617,510 | A | 4/1997 | Keyrouz et al. | 706/45 |
| 5,732,192 | A | 3/1998 | Malin et al. | 703/2 |
| 5,732,277 | A | 3/1998 | Kodosky et al. | 717/4 |
| 5,812,394 | A | 9/1998 | Lewis et al. | 700/17 |
| 5,826,236 | A | 10/1998 | Narimatsu et al. | 705/8 |
| 5,850,221 | A | 12/1998 | Macrae et al. | 345/348 |
| 6,323,882 | B1 * | 11/2001 | Jerome et al. | 345/744 |

OTHER PUBLICATIONS

Linninger, et al., "M–Project—Organizing Problem Representation and Modeling of Steady State and Dynamic Processes", *Computer chem. Engng*, vol. 20, Suppl., pp. S425–S430, 1996.

Srinivassan, et al., "Automation HAZOP analysis of batch chemical plants: Part I. The knowledge representation framework", *Computers Chem. Engng*, vol. 22, No. 9, pp. 1345–1355, 1998.

Srinivasan, et al., "Automating HAZOP analysis of batch chemical plants: Part II. Algorithms and application", *Computers Chem. Engng*, vol. 22, No. 2, pp. 1357–1370, 1998.

Isomura, et al., "Visual Programming Expedites Process Control", *IEEE Computer Applications in Power*, pp. 52–57, Oct. 1996.

SystemBuild, "Visual Design Environment", Integrated Systems, MATRIX$_X$, (www.isi.com), 7 pages, 1997.

Jeffreys, "Software Review: Looks may not be deceiving after all", *Control Engineering*, p. 100, Aug. 1998.

Jeffreys, "Software Review: Structured programming for Quantum PLCs", *Control Engineering*, p. 146, May 1998.

Automation Software Guide, "Design & Development Tools", *Control Engineering/Automation Software Guide*, pp. 36–42, Mar. 30, 1998.

VanDoren, "Software Review: PC–Based Control Software Runs on Schedule", *Control Engineering*, p. 90, Jan. 1998.

Jeffreys, "Software Review: Graphical programming for analog control", *Control Engineering*, p. 96, Jun. 1998.

Harrold, "Object–oriented Functional Specs are Key to Surprise–free Automation", *Control Engineering*, pp. 79–82, Jun. 1998.

Jeffreys, "Software Review: Structured programming tools for embedded systems", *Control Engineering*, p. 200, Sep. 1998.

Rodrigues, et al., "Structure Notation of Dynamic Systems: A Pictorial Language Approach", *IEEE Computer Society Press*, pp. 219–228, May 16–19, 1994.

Mahalec, "Software Architecture for On–Line Modeling and Optimization", http://www.aspentec.com/articles/onlineop.htm, 16 pages, Oct. 1, 1998.

"Fig. 2.1: Hierarchy of Plant Automation", http://www.aspentec.com/articles/hieplaut.gif, 1 page, Oct. 1, 1998.

"Fig. 4.1: Model Initialization", http://www.aspentec.com/articles/modelini.gif, 1 page, Oct. 1, 1998.

"Fig. 4.2: From Simulation to Optimization", http://www.aspentec.com/articles/simopt.gif, 1 page, Oct. 1, 1998.

"Fig. 5.1: Steady–State Modeling & Optimization System", http://www.aspentec.com/articles/fi51stms.gif, 1 page, Oct. 1, 1998.

"Fig. 5.2: Two Views of an Equation–Oriented Modeling Environment", http://www.aspentec.com/articles/twoviews.gif, 1 page, Oct. 1, 1998.

"Fig 6.1: On–Line Implementation Structure", http://www.aspentec.com/articles/fi61onli.gif, 1 page, Oct. 1, 1998.

Hardin, et al., "Rigorous Crude Unit Optimization at Conoco's Lake Charles Refinery", http://www.aspentec.com/articles/aprrtopt.htm, 18 pages, Oct. 13, 1998.

AspenTech, "Aspen Technology Introduces Aspen Engineering Suite", http://www.aspentec.com/press/980504.htm, 4 pages, Oct. 13, 1998.

AspenTech, "Plantelligence", http://www.aspentec.com/tp/tpplantelligence.htm, 1 page, Oct. 13, 1998.

AspenTech, "Plantelligence", http://www.aspentec.com/tp/tpplantelligence2.htm, 1 page, Oct. 13, 1998.

AspenTech, "Plantelligence", http://www.aspentec.com/tp/tpplantelligence3.htm, 2 pages, Oct. 13, 1998.

Benson, "Simulation Modeling And Optimization Using Promodel", Proceedings of the 1996 Winter Simulation Conference, pp 447–452.

Banks, "Software For Simulation", Proceedings of the 1996 WInter Simulation Conference, pp 31–38, Dec. 8–11, 1996.

Software Development and Licensing Agreement between Shell Oil Products Company and Simulation Sciences, Inc. executed on Feb. 22, 1996.

Computer Program License Agreement between Shell Oil Products Company and Simulation Sciences, Inc. executed Dec. 3 and 24, 1998.

Amendment No. 1 to Opera/Mitre Software License Agreement between Shell Oil Products Company and Simulation Sciences, Inc. executed on Oct. 8 and 13, 1998.

* cited by examiner

INTERACTIVE PROCESS MODELING SYSTEM

The present application claims priority from U.S. Provisional Patent Application No. 60/105,763 filed on Oct. 26, 1998. The contents of that application, in its entirety, is hereby incorporated by reference.

BACKGROUND OF THE INVENTION

1. Field of the Invention

The present invention is related to systems and methods for analyzing process models. More particularly, this invention is related to systems and methods for analyzing plant process models.

2. Description of the Related Art

Process industries, including but not limited to refining, chemical, petrochemical, and pharmaceutical processing, have experienced a need to operate ever more efficiently in order to remain competitive. This need has resulted in the development and deployment of process modeling systems. A process engineer uses these modeling systems to build a process model, or flowsheet, of an entire processing plant using equipment models provided by the modeling system. These flowsheet models are used to design and evaluate new processes, redesign and retrofit existing process plants, and optimize the operation of existing process plants. Typically, the process engineer must first build the flowsheet model, compile the model, and perform model checking before any model errors are detected.

Conventional modeling systems typically provide simulation, data reconciliation, and optimization of plant processes using corresponding unique programs and unique models. Each unit is associated with a set of equations and variables which, when solved, represent the operation of the specific process equipment. Conventionally, equations are solved or converged when executing applications such as simulation, data reconciliation, and optimization. Conventionally, the set of equations and variables provided by the modeling system is static and cannot be easily changed. Thus, models cannot be customized by a user to more closely represent the operation of the plant process equipment.

Typical modeling systems determine the solvability or convergence of a complex flowsheet model with recycles at the time of execution, after the flowsheet model has been fully generated and configured. It is at this point, after the user has expended great amounts of time and resources in generating and configuring the flowsheet model, that the user typically first learns whether the system of equations will converge. If the flowsheet model equations fail to converge at the time of execution, the process of making corrections and re-executing the desired application has to be repeated until the system of equations converge. Finding the element of error, and correcting the error, in a large and complex flowsheet model is an onerous and difficult task. Determining the correctness of the flowsheet model at the time of execution results in unnecessary and excessive waste in valuable human and computing resources.

SUMMARY OF THE INVENTION

The present invention relates to systems and methods for analyzing plant process models. Thus, a user may advantageously customize unit models and stream models to enhance the analysis of a process model.

In a preferred embodiment, a flowsheet model is composed of individual unit models connected by streams. A unit may be divided into process and non-process units. A process unit is an item of operating hardware such as a heat exchanger or a pump. A non-process unit is something other than an item of operating hardware. For example, a non-process unit may be a penalty unit used in assigning penalty weights to measured values beyond a specified range. Another example of a non-process unit may be a measurement from measuring devices such as flow meters, thermocouples, and pressure gauges. In one embodiment, each unit model is defined in terms of its variables, parameters, and equations, collectively known as a calculation block.

Typically, each unit has one or more entry or exit ports. A stream is connected to the unit's entry port or exit port. A feed stream is connected to a unit's entry port, whereas a product stream is connected to a unit's exit port. Therefore, depending on the perspective of the connected port, a stream can be both a product stream and a feed stream.

Streams are also divided into process streams and non-process streams. A process stream connects two process units with compatible input and output, and represents a physical stream. A non-process stream represents two variables, or two groups of variables, that are equivalent or compatible, such as a measurement to a controller.

In one preferred embodiment, a Graphical User Interface (GUI) is used to build and specify a specific flowsheet configuration, such as a process plant or refinery, as represented by a particular arrangement of process units, connecting streams, parameters, variable values, operating specifications, and the like. The GUI incorporates user interface features such as tree views, drag-and-drop functionality, and tabbed windows to enhance the intuitiveness and usability of the interface.

In accordance with one embodiment of the invention, a single flowsheet configuration is enabled to be used in multiple calculation modes. In one preferred embodiment, three calculation modes, simulation, data reconciliation, and optimization, are provided. The calculation modes refer to alternative flowsheet solution-types that are designed to accomplish different solution objectives. For example, a single flowsheet model may generate an open-form equation representation for use in simulation, an open-form equation representation for use in data reconciliation, and an open-form equation representation for use in optimization.

In one preferred embodiment, the flowsheet model can be made square or solvable by a user. Typically, the number of variables in a unit model, and corresponding flowsheet model, exceeds the corresponding number of equations. However, in order for the flowsheet model to be solvable, the number of variables and equations associated with the flowsheet model should be equal. Thus, there should be zero degrees of freedom for the flowsheet to be solvable. Alternatively, the excess degrees of freedom should be accounted for in order to be solvable. For example, an equation may be interactively added by a user to make the number of equations and the number of variables equal, thus accounting for the excess degrees of freedom.

In one preferred embodiment, a user creates an instance of the unit by dragging and dropping an icon, using a pointing device such as a mouse, onto a flowsheet. The user is continuously informed of the current solvability state of the flowsheet model and the unit. For example, a user may instantiate a pump into a flowsheet. The pump's name box may be colored, for example red, to indicate the need for user data. In another embodiment, an additional window may present to the user the independent-fixed variables requiring user supplied data. The variable's data entry box may be red to indicate the need for user data.

Furthermore, the user is able to make modifications to the units, streams, and flowsheet efficiently. For example, pointing to and clicking on an instantiated unit using a mouse or the like may permit access to its calculation block. In another embodiment, the current degrees of freedom for a flowsheet model will continuously be calculated and maintained after each modification to the flowsheet model. The user may access a current count of the degrees of freedom for the flowsheet. For example, in one embodiment, accessing a GUI window indicates to the user the current degrees of freedom.

In another embodiment, the flowsheet model contents may be presented in a hierarchical, directory-like listing. Clicking on an intermediate node may expand the node and display the elements below the node. For example, clicking on a pump contained in the flowsheet hierarchical listing may display the variables contained in the pump's model.

In a further embodiment, the flowsheet elements may be grouped into a collection. The collection may subsequently be collapsed into a single icon representation and may be treated as any other unit. For example, the user may delete the collection from the flowsheet, move the collection to another location in the flowsheet, and the like. Furthermore, the collection may be expanded to reveal the individual elements which comprised the collection.

In yet another embodiment, links may be created between flowsheet model elements and external databases. For example, a flowsheet model variable may be linked to an external database and obtain its value from the external database. Once the link is established, data may be transferred in both directions. For example, the variable may obtain its value from the database as well as write its value into the database.

In another preferred embodiment, each unit operation model has a unit customization layer. The unit customization layer permits a user to override predefined unit specifications. Typically, unit customization is accomplished by freeing one or more variables previously fixed, and then fixing other stream or unit variables in its place. In another embodiment, a user may enhance predefined unit models by defining additional user variables and equations which use existing or user-defined variables. The number of variables and equations may become part of the unit alone, thus permitting an analysis of the status of the variables and the equations at the unit level. This analysis may be performed to determine whether the number of variables to the number of equations have changed, and whether there are any unaccounted for degrees of freedom.

In yet another preferred embodiment, the unit customization layer is interfaced to a flowsheet customization layer. A user may establish relationships between different units and streams using the flowsheet customization layer. The custom equations and variables may belong to any of the units on the flowsheet.

Other features and advantages of the present invention will become more fully apparent through the following description.

BRIEF DESCRIPTION OF THE DRAWINGS

These and other aspects, advantages, and novel features of the invention will become apparent upon reading the following detailed description and upon reference to accompanying drawings in which.

DETAILED DESCRIPTION OF THE PREFERRED EMBODIMENT

The present invention relates to systems and methods for interactively analyzing plant process models. Thus, a user may advantageously customize unit models and stream models to enhance the analysis of a process model.

Figure 1:
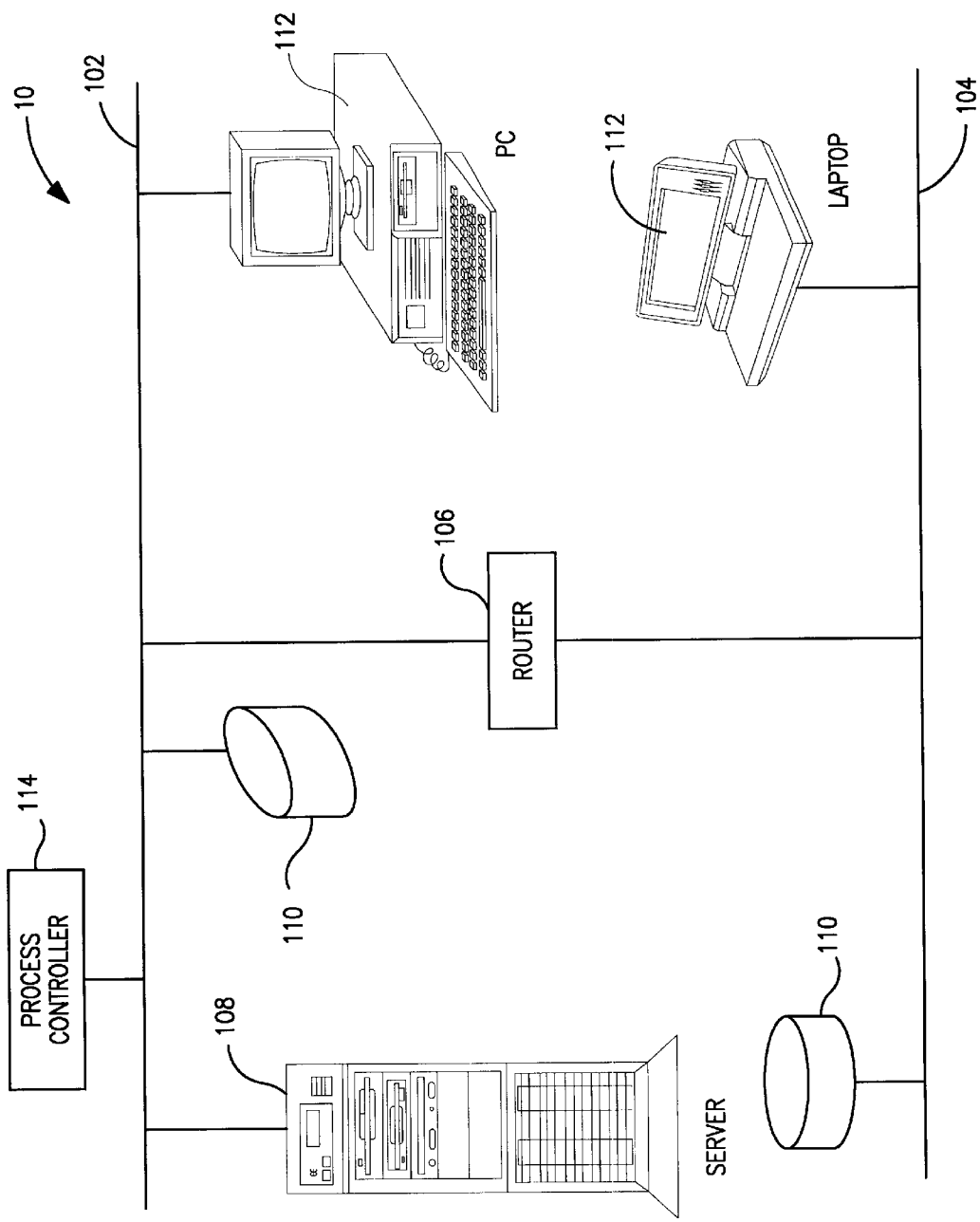
FIG. 1 is an illustration of an embodiment of the overall network architecture.

One network architecture which may be used with one embodiment of the present invention is indicated generally at 10 in FIG. 1. (In FIG. 1 and throughout the drawings, components which correspond to components shown in previous figures are identified using the same reference numbers.) The system 10 may include a local area network (LAN) 102 which is connectable to other networks 104, including other LANs or portions of the Internet or an intranet, through a router 106 or similar mechanism. One example of such a LAN 102 may be a plant process control network to which process control devices, such as a process controller 114, are connected. An example of such a network 104 may be a corporate computing network, including possible access to the Internet, to which other computers and computing devices physically removed from the plant floor are connected. In one embodiment, the LANs 102, 104 conform to Transmission Control Protocol/Internet Protocol (TCP/IP) and Common Object Request Broker Architecture (CORBA) industry standard as specified by the Object Modeling Group (OMG). In alternative embodiments, the LANs 102, 104 may conform to other network standards, including, but not limited to, the International Standards Organization's Open Systems Interconnection, IBM's SNA®, Novell's Netware®, and Banyon VINES®.

The system 10 includes a server 108 that is connected to the process control network 102 or corporate computing network 104 and communicates with one or more clients 112. In one preferred embodiment, the server 108 includes a DEC Alpha® NT operating system. In an alternative embodiment, the server 108 includes a UNIX operating system. In one preferred embodiment, the client 112 includes a Windows® NT operating system. The server 108 and clients 112 may be configured by those of skill in the art in a wide variety of ways to operate according to the present invention. The server 108 and clients 112 may be uniprocessor or multiprocessor machines. The server 108 and clients 112 each include an addressable storage medium such as random access memory and may further include a non-volatile storage medium such as a magnetic or an optical disk.

The system 10 also includes a storage medium 110 that is connected to the process control network 102 or corporate control network 104. In one embodiment, the storage medium 110 may be configured as a database from which data can be both stored and retrieved. The storage medium 110 is accessible by devices, such as servers, clients, process controllers, and the like, connected to the process control network 102 or the corporate control network 104.

Suitable servers 108 and clients 112 include, without limitation, personal computers, laptops, and workstations. A given computer may function both as a server 108 and as a client 112. Alternatively, the server 108 may be connected to the other network 104 different from the LAN 102. Although particular computer systems and network components are shown, those of skill in the art will appreciate that the present invention also works with a variety of other networks and components.

Figure 2:
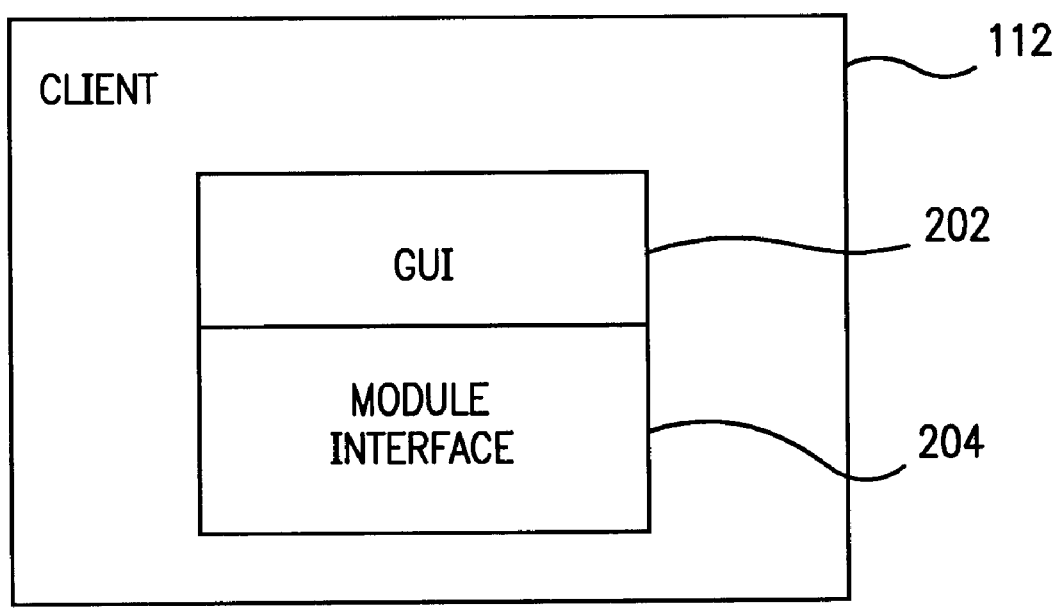
FIG. 2 is a high level block diagram illustrating the client system architecture.
Figure 10:
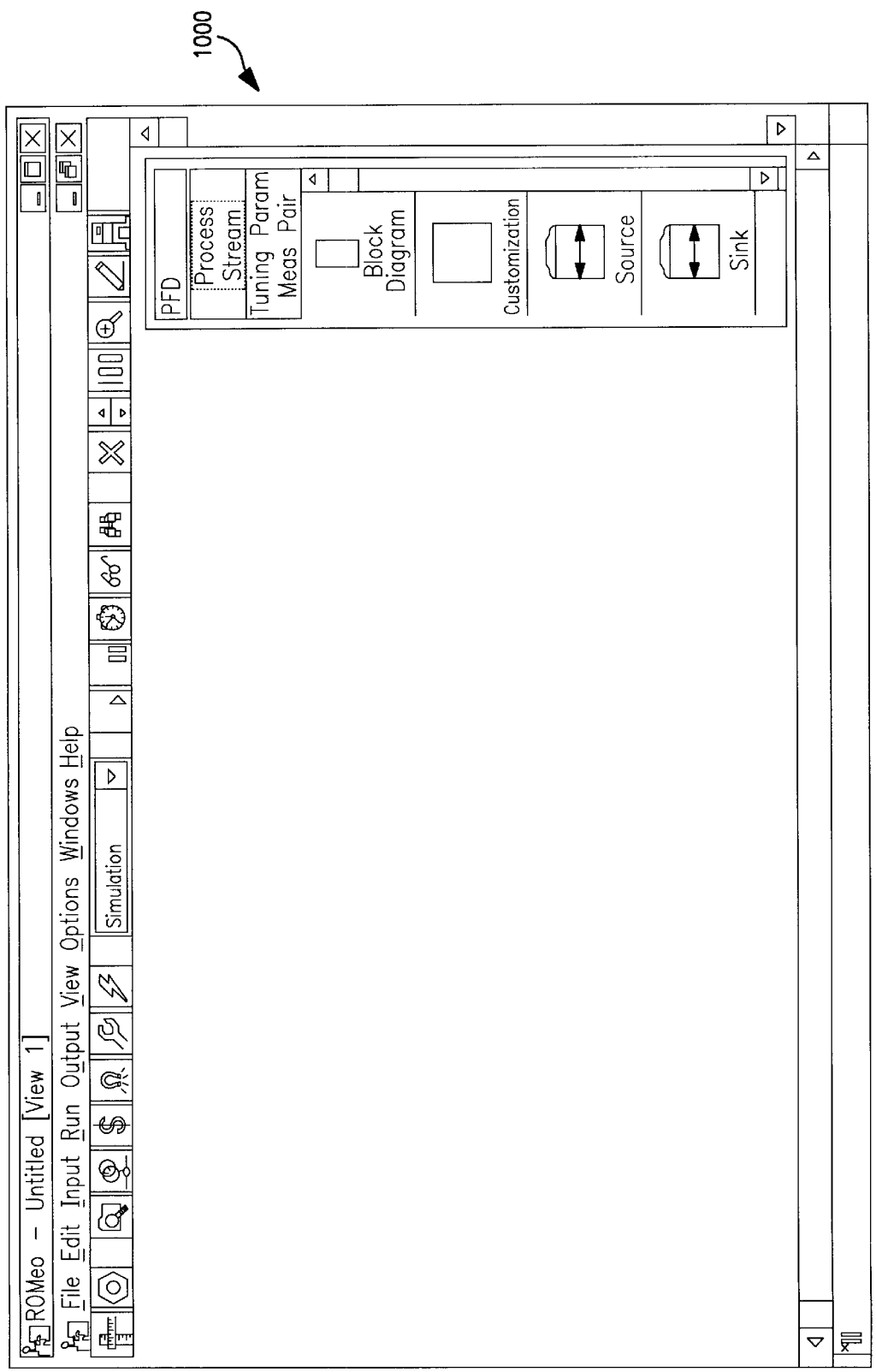
FIG. 10 illustrates one embodiment of a Graphical User Interface (GUI)

FIG. 2 illustrates an architecture of the client 112 which may be used with one preferred embodiment of the present invention. The client 112 provides access to the functionality provided by the server 108. The client 112 includes a GUI 202 and an optional module interface 204. The Graphical User Interface (GUI) 202 is used to build and specify model applications. One embodiment of the GUI 202 incorporates user interface features such as tree views, drag-and-drop functionality, and tabbed windows to enhance the intuitiveness and usability of the interface. The GUI 202 further enables access to other encapsulated GUIs such as process unit GUIs, non-process unit GUIs, and stream GUIs as described below. One example of a GUI is depicted generally at 1000 in FIG. 10.

Access to the GUI 202, as well as other architectural objects to be discussed in detail below, are through the optional module interface 204. In one embodiment, the module interface 204 is the Interface Definition Language (IDL) as specified in the CORBA/IIOP 2.2 specification. In one embodiment, the module interface 204 provides a uniform interface to the architectural objects, such as the GUI 202. The module interface 204 allows the actual implementation of the architectural objects, such as the GUI 202, to be independent of the surrounding architecture, such as the operating system and network technology. One of ordinary skill in the art will recognize that the module interface 204 may conform to other standards, or even be non-existent.

Figure 3:
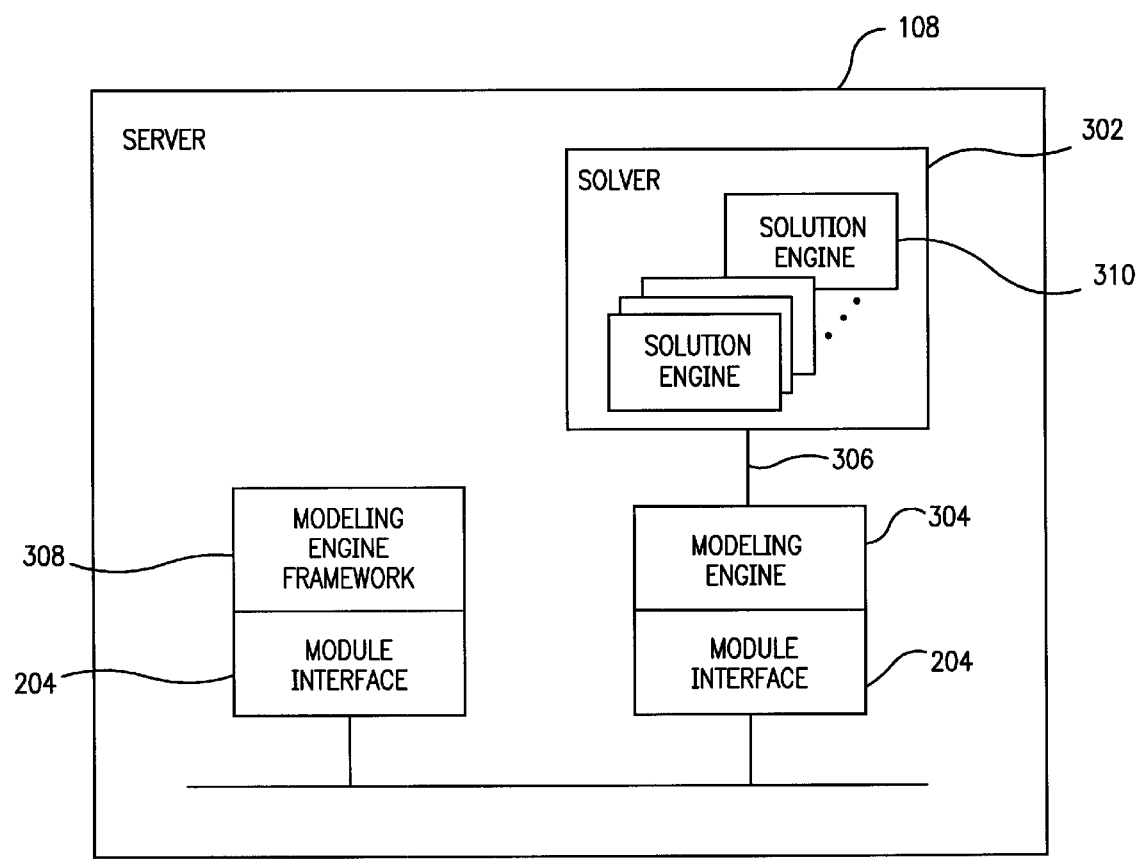
FIG. 3 is a high level block diagram illustrating the server system architecture.

FIG. 3 illustrates the architecture of the server 108 suitable to implement one preferred embodiment of the present invention. The server 108 includes a solver 302 accessible by a modeling engine 304 through an access mechanism 306, and a modeling engine framework 308. As described above, the optional module interface 204 provides uniform access to, and implementation independence and modularity for both the modeling engine 304 and the modeling engine framework 308.

The modeling engine 304, discussed in further detail below, provides an environment for building and solving process models. The solver 302 provides a solution algorithm for solving a process model generated by the underlying modeling engine 304. In one embodiment, the solver 302 may contain one or more solution engines 310 which are used in solving different process models. For example, one solver which may be used is Opera, a solver available from Simulation Sciences Inc. as part of the ROMeo System. In one embodiment, the solver 302 comprises a solution engine 310 implemented as a generalized matrix solver utilizing a Harwell subroutines. As is well known in the art, the Harwell library is an application independent library of mathematical subroutines used in solving complex mathematical equation sets. In one embodiment, the access mechanism 306 is specific to the solution engine 310 contained in the solver 302 and the modeling engine 304 used in generating the math model.

The modeling engine framework 308 is an interpretive layer providing user-friendly access to the modeling engine 304. In one embodiment, the modeling engine framework 308, working in conjunction with the GUI 202, provides a user the ability to add new unit models, modify existing unit models, and generally interact with the modeling engine 304 without having to know the specifics of the modeling engine 304.

Figure 4:
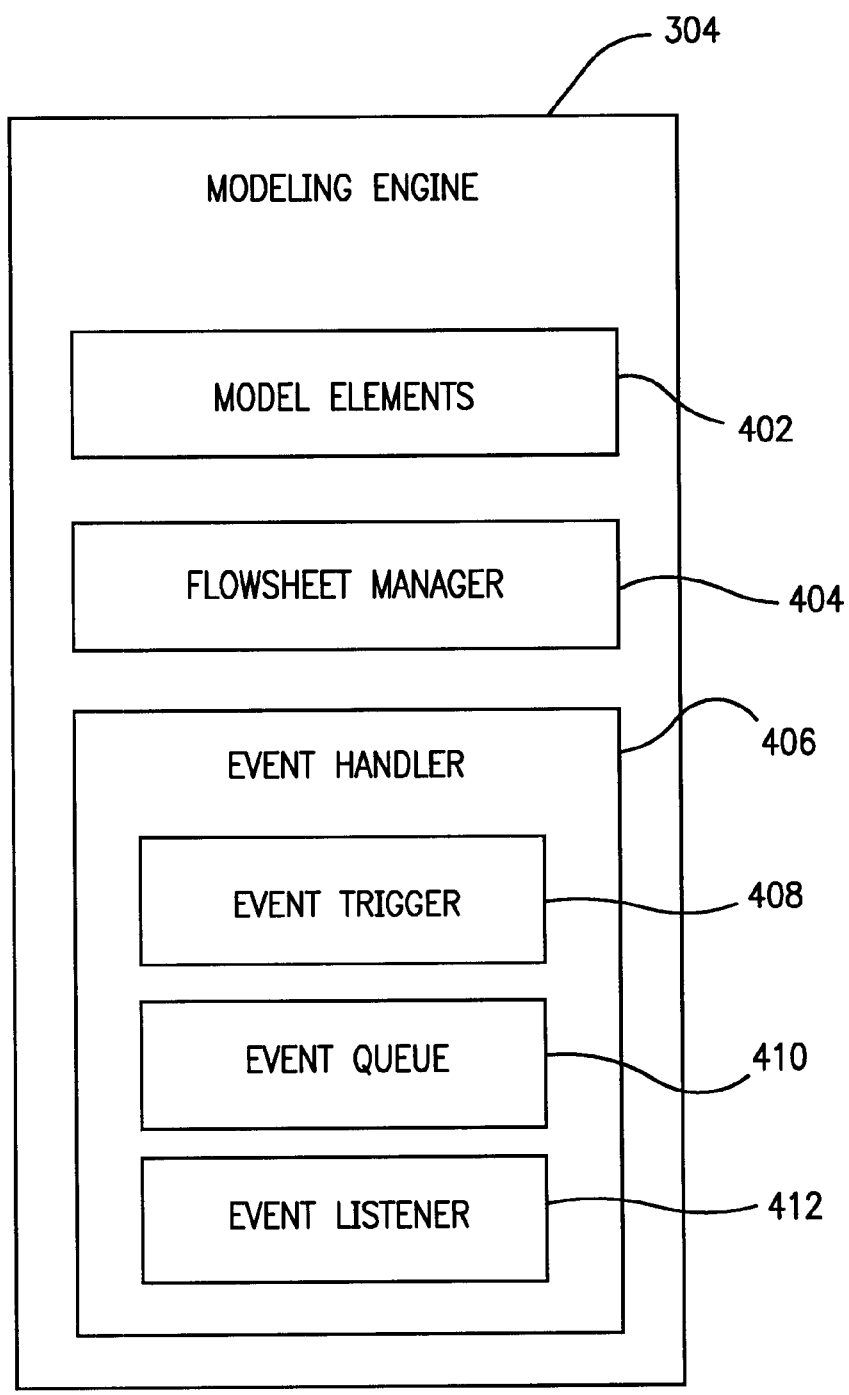
FIG. 4 is a high level block diagram illustrating the modeling engine architecture.

FIG. 4 further illustrates certain additional components comprising the modeling engine 304 in one preferred embodiment. The modeling engine 304 comprises a model elements 402, a flowsheet manager 404, and an event handler 406. The model elements 402 include individual units and streams from which a user builds a flowsheet model. For example, a pump is a unit which the user may include in a flowsheet model.

A unit represents a device which may be found in a process plant. The unit may be a process or a non-process unit. A process unit is an item of operating hardware such as a heat exchanger, a compressor, an expander, a firebox, a pipe, a splitter, a pump, and the like.

A non-process unit is something other than an item of operating hardware. For example, a non-process unit may be a penalty. For example, a process unit, such as a furnace, is set to operate at an optimum output temperature. The amount of fuel input to the furnace is varied in order to achieve the optimum output temperature. A penalty unit assigns a progressively increasing weight to a measured output temperature value beyond the optimum output temperature. For example, the penalty unit may account for the increased cleanup costs associated with operating the furnace at the higher than optimum output temperature.

Another example of a non-process unit may be a measurement from measuring devices such as flow meters, thermocouples, and pressure gauges.

In one embodiment, each unit is associated with a model. The model is a collection of variables and equations, collectively known as a calculation block. For example, an equation for a measurement unit may be:

$$ModelVariable-Scan-Offset=0$$

where ModelVariable is a calculated value, Scan is a measured value, and Offset is the difference between ModelVariable and Scan. The above equation contains three variables: ModelVariable, Scan, and Offset.

As another example, the equations for a pump unit may be:

$$PresRise-Product:Pres+Feed:Pres=0,$$

and $$Head*GravConst*Feed:Prop["WtDens"]-1000*PresRise=0$$

where PresRise is a rise in pressure, Product:Pres is an output pressure, Feed:Pres is an input pressure, Head is a liquid height within a tank connected to the pump, GravConst is the gravity constant, Feed:Prop["WtDens"] is a weight density of the liquid in the tank, and PresRise is a rise in pressure of the pump. In the first equation, PresRise, Prod:Pres, and Feed:Pres are variables. In the second equation, Head, Feed:Prop["WtDens"], and PresRise are variables. GravConst is a parameter, and thus requires a value to be assigned before the equation may be solved.

Figure 11:
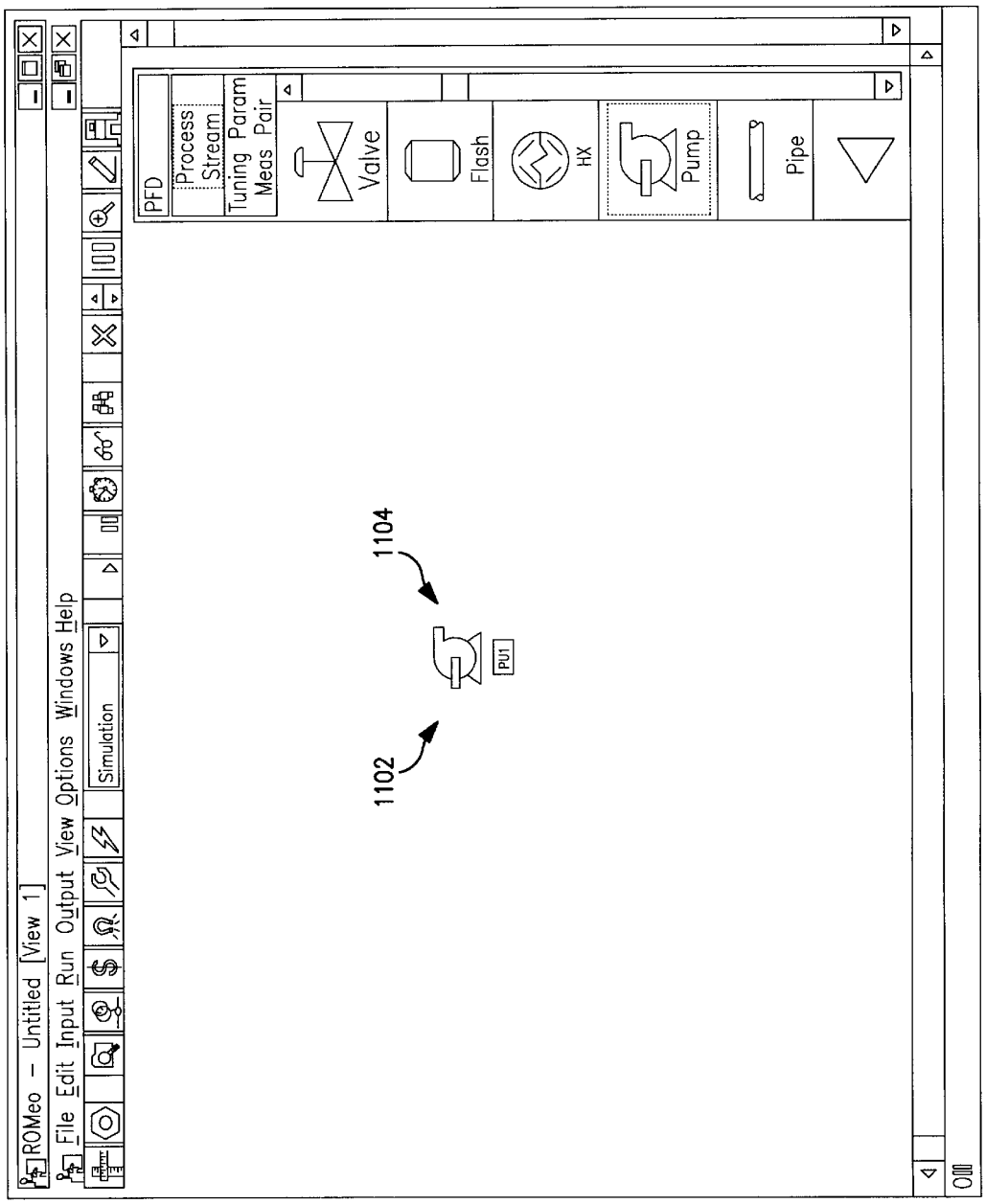
FIG. 11 illustrates one embodiment of a pump displayed in a GUI.

A unit model represents the operation of the unit in terms of its associated calculation block. Typically, the unit has one or more entry or exit ports. For example, FIG. 11 illustrates a pump with an entry port 1102 and an exit port 1104.

Figure 12:
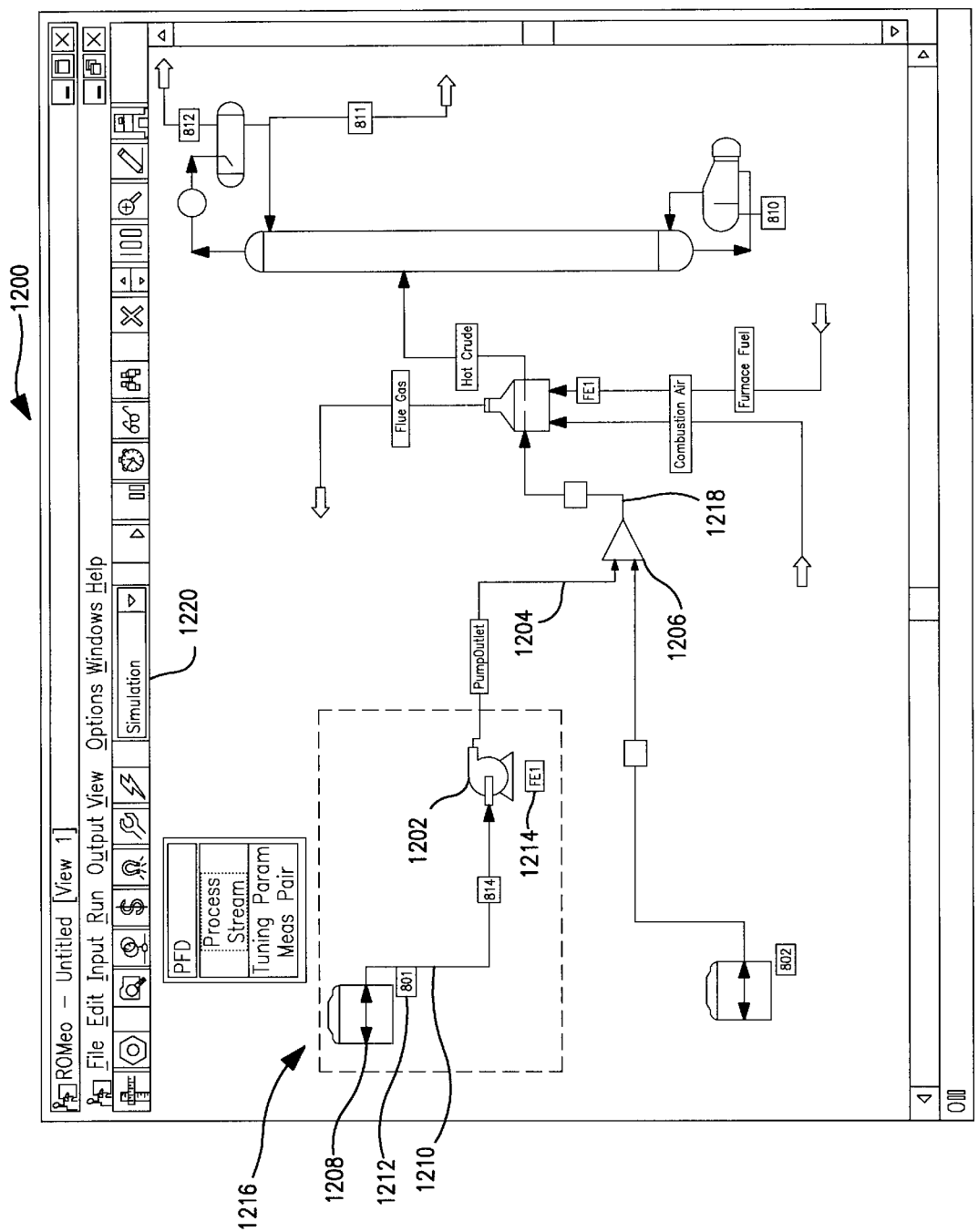
FIG. 12 illustrates one embodiment of a flowsheet model displayed in a GUI.

A stream is used to connect a unit's entry or exit port to another unit's exit or entry port respectively. For example, FIG. 12 illustrates a pump outlet stream 1204 connecting an exit port of a pump 1202 to an input port of a mixer 1206. Furthermore, a feed stream is connected to the unit's entry port, whereas a product stream is connected to the unit's exit port. Therefore, depending on the perspective of the connected port, a stream can be both a product stream and a feed stream. For example, the pump outlet stream 1204 is the feed stream of the mixer 1206 as well as the product stream of the pump 1202. A stream model may have associated equations and variables.

The variables contained within a unit model or a stream model may be identified as dependent, independent-fixed, or independent-free. A dependent variable may be thought of as an equation output or a free variable. An independent variable may be thought of as an equation input. A fixed variable may be thought of as a constant. A free variable may be thought of as a variable requiring a calculated value. For example, for the general equation:

$$y=ax+b$$

where "y" and "x" are variables, and "a" and "b" are parameters. Parameters are assigned values in order for the equation to be solved. The variable "y" is a dependent or free variable. The variable "x" is an independent-fixed variable. An independent-fixed variable needs a supplied value in order for the equation to be solved. For example, in the pump equation:

$$Head*GravConst*Feed:Prop["WtDens"]-1000*PresRise=0$$

The dependent variable is Head. The independent-fixed variables are Feed:Prop["WtDens"] and PresRise, and the parameter is GravConst.

In one preferred embodiment, multi-dimensional data structures are used to store individual units and streams, and their associated variables and equations. The data structures may also store other information such as, but not limited to, the type of unit or stream, whether a variable requires a user-provided value, the variable's lower bound, upper bound, solution value, or status. One of ordinary skill in the art will recognize that the data structures may be in the form of an array, linked list, or as elements within other data structures.

The flowsheet manager 404 provides access to instances of unit models, stream models, and other information associated with a flowsheet model. In one embodiment, the information associated with a flowsheet model may be stored in the storage medium 110. Preferably, the storage medium 110 stores at least one flowsheet model, including an equation, of an actual plant process. The flowsheet manager 404 may then communicate with the storage medium 110 to provide a user access to the information contained in the storage medium 110 in a manageable format.

Figure 13:
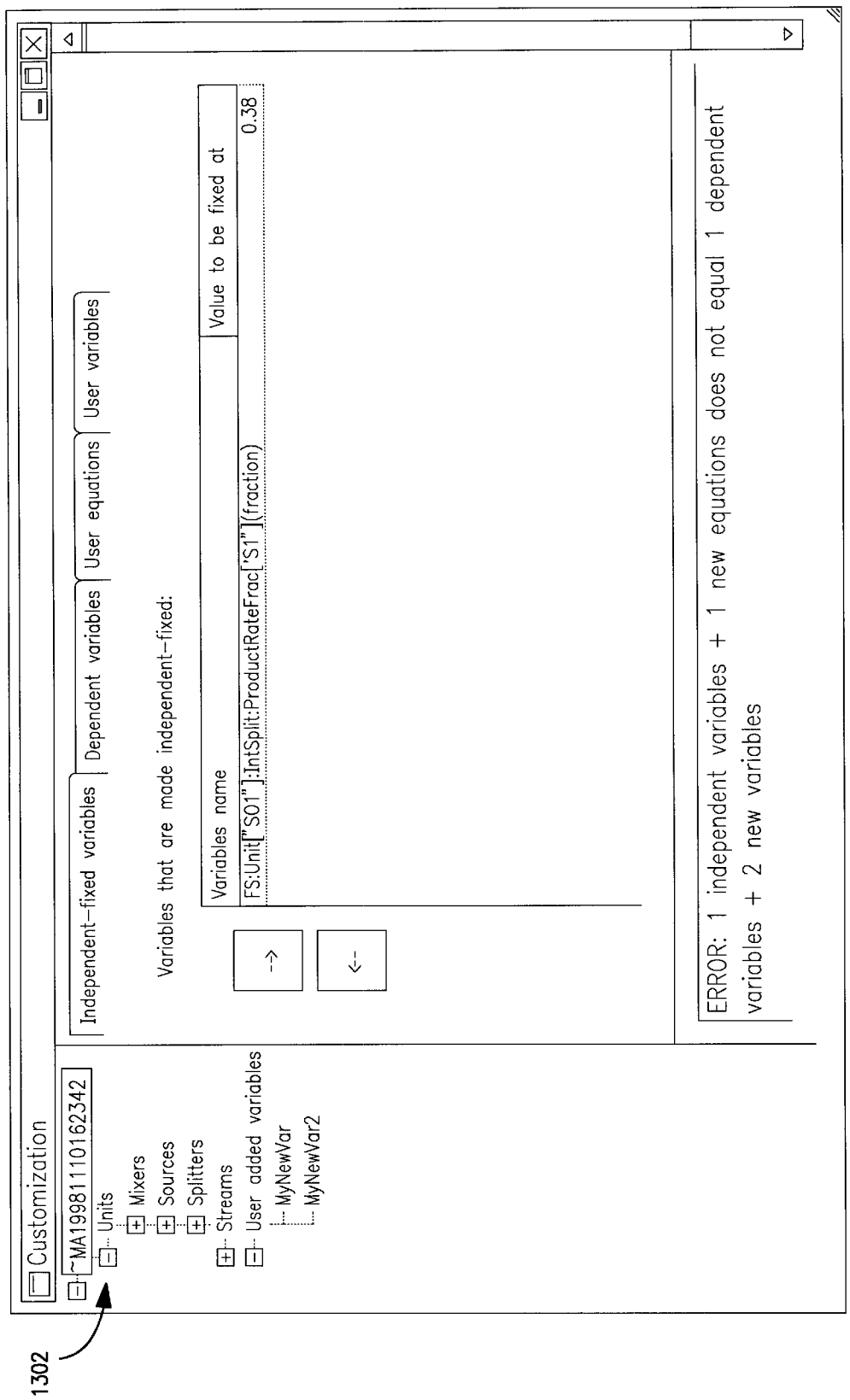
FIG. 13 illustrates one embodiment of a hierarchical tree listing a flowsheet model elements.

In one preferred embodiment, the flowsheet model elements are presented in a hierarchical tree, similar to a directory tree. For example, FIG. 13 illustrates a listing 1302 presenting a flowsheet model elements in a directory-like tree. Clicking on an intermediate node may expand the node and display the elements below the node.

Figure 17:
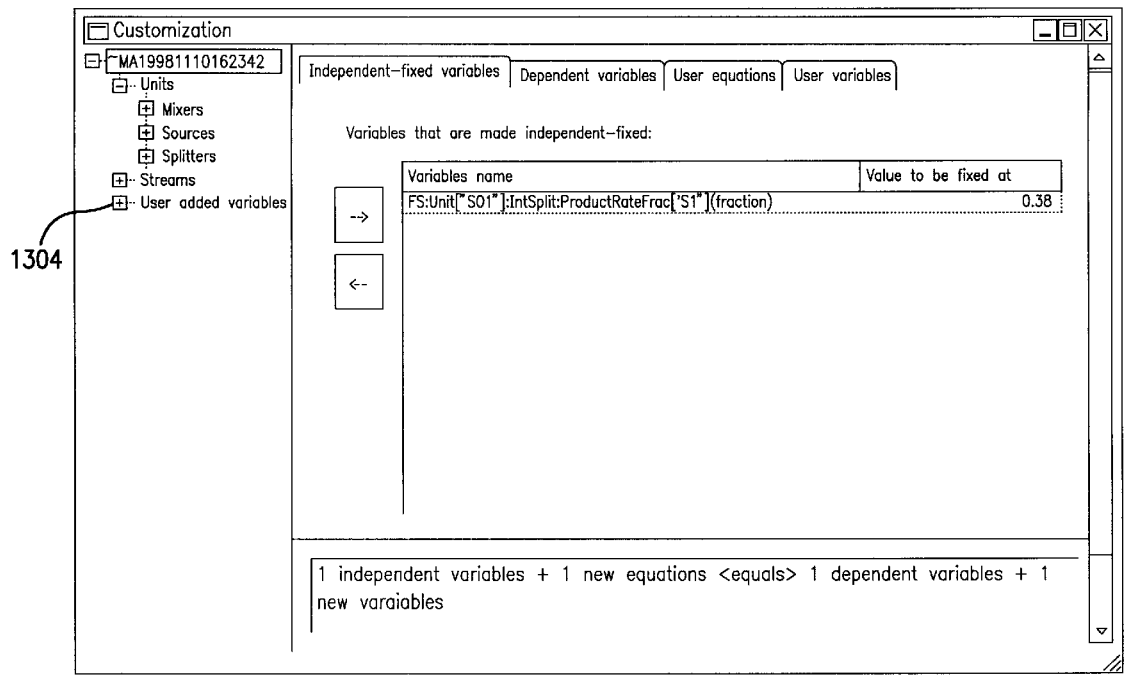
FIG. 17 illustrates another embodiment of a hierarchical tree listing a flowsheet model elements.

In one embodiment, pointing and clicking on a pump contained in the flowsheet model hierarchical tree listing displays the variables contained in the pump's model. For example, clicking a user added variables button 1304 expands the listing to display the user added variables. As further illustrated in FIG. 17, clicking the user added variables button 1304 again collapses the expanded listing and the user added variables are no longer displayed. Thus, this invention advantageously provides the user added flexibility in creating, modifying, and altering the flowsheet model by interactively providing access to a greater number of desired elements in the flowsheet.

As explained below, the event handler 406 maintains the consistency of the flowsheet model. In one preferred embodiment, the event handler 406 includes an event trigger 408, an event queue 410, and an event listener 412. The event trigger 408 is called in response to a change to the flowsheet model, and queues up the change in the event queue 410. In one embodiment, the event queue 410 may be implemented as part of a database. The event listener 412 monitors the event queue 410 and in response to the contents contained in the event queue 410, appropriately alters the flowsheet model. For example, if a user removes an element, such as a unit, from the flowsheet model, all references in the flowsheet model to that element are removed, thus maintaining the consistency of the flowsheet model.

Figure 5:
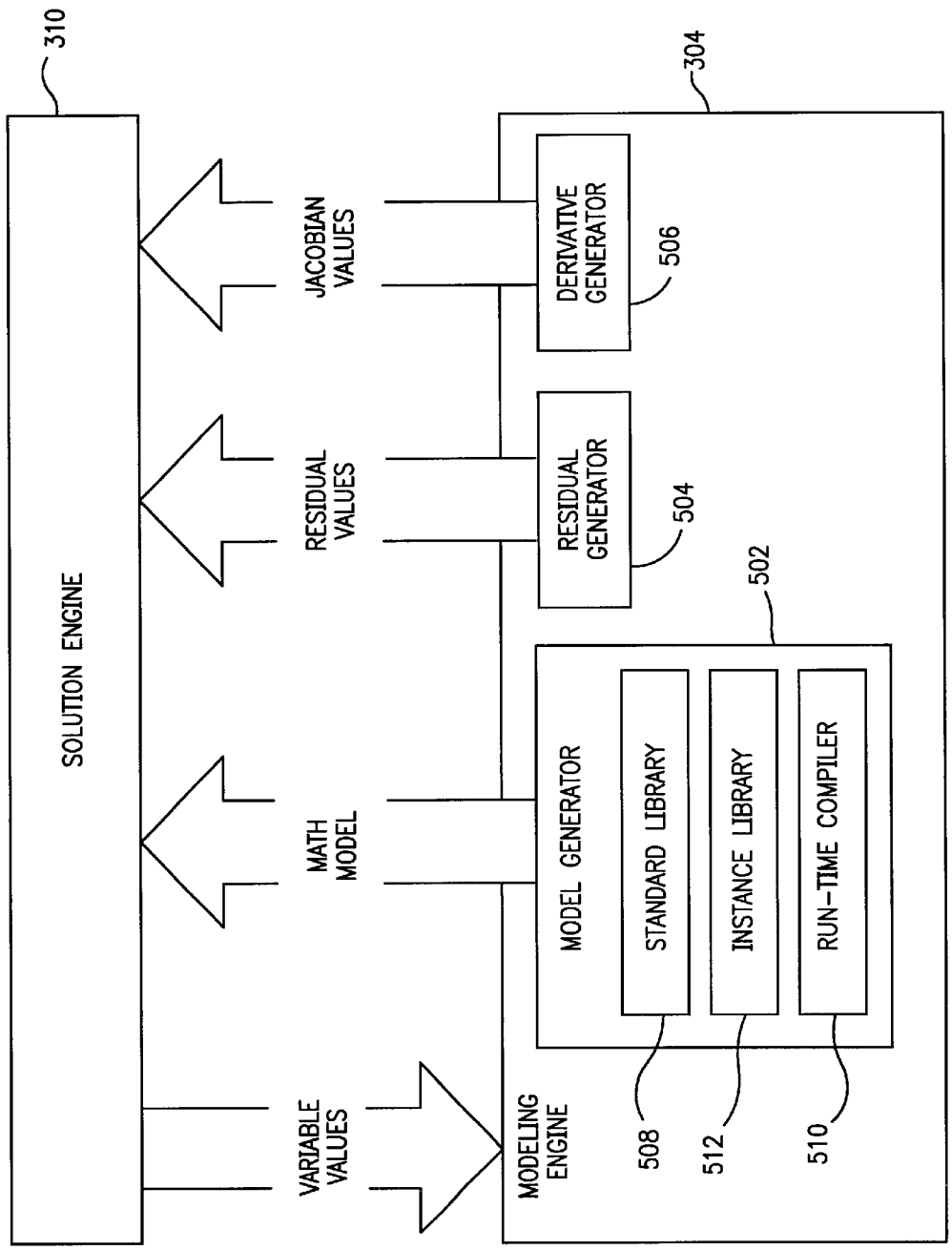
FIG. 5 is a high level block diagram illustrating one embodiment of the interaction between a modeling engine and a solution engine.

FIG. 5 further illustrates one embodiment of the interaction between the modeling engine 304 and the solution engine 310. The modeling engine 304 additionally comprises a model generator 502, a residual generator 504, and a derivative generator 506, all discussed in further detail below. The modeling engine 304 provides the open form of model equations to the solution engine 310. The solution engine 310, in turn, solves the equations. In an alternative embodiment, a closed form of the model equations may be provided by the modeling engine 304.

In one embodiment, the model generator 502 creates a math model of the flowsheet for input to the solution engine 310. The math model is a large set of equations and variables which models the plant process. In one embodiment, the math model is in the form of a matrix which represents the equations contained in the flowsheet model in the form f(x)=0. The math model may also contain other information, such as parameter values and the like, used in solving or converging the math model. Standard equations and variables associated with a corresponding unit model or stream model are provided in a previously compiled standard library 508. If the user customizes any unit model, for example, through a customization module 608 discussed further below, a run-time compiler 510 compiles the customized unit models to generate an instance library 512. The math model is created by the model generator 502 using the standard library 508 and the instance library 512, if one exists. Thus, in contrast to conventional modeling systems, this invention advantageously provides a user the interactive capability to uniquely modify the behavior of any device in the flowsheet model, thus enhancing the analysis of a plant process.

One embodiment of the run-time compiler 510 operates as follows. The run-time compiler 510 checks each unit and stream model contained in the flowsheet, identifies and compiles the customized models, and generates an instance library 512. A status indicator may identify the customization status of each unit or stream model contained in the flowsheet. The status indicator may be implemented as part of each unit and stream model's multi-dimensional data structure. In an alternative embodiment, rather than checking each unit and stream contained in the flowsheet, a list of the customized unit and stream models may be maintained. The run-time compiler 510 then compiles the customized unit and stream models using the list, and thus does not have to check every unit or stream model. In another embodiment, the run-time compiler 510 may compile each unit or stream model as it is customized.

In one preferred embodiment, the residual generator 504 uses the variable values generated by the solution engine 310 to calculate residual values for the equations in the math model. A residual value is the value of the equation f(x) when calculated. When the residual is zero, the equation f(x) is solved. The derivative generator 506 calculates Jacobian, or derivative values for each of the equations contained in the flowsheet model. The solution engine 310 uses the residual values and the Jacobian values generated respectively by the residual generator 504 and the derivative generator 506 to calculate the variable values. The process of generating the variable values, residual values, and Jacobian values may need to be repeated numerous times before the math model is solved or converges.

One example of the steps required to solve or converge a math model is as follows:

1. model generator 502 creates a math model
2. math model is input to the solution engine 310
3. solution engine determines variable values for the math model using the residual values and Jacobian values, if provided by the residual generator 504 and derivative generator 506
4. residual generator 504 determines the residual values
5. derivative generator 506 determines the derivative values
6. the residual values and the derivative values are input to the solution engine 310

The steps 3 to 6 are repeated until the math model is solved or converges.

Figure 6:
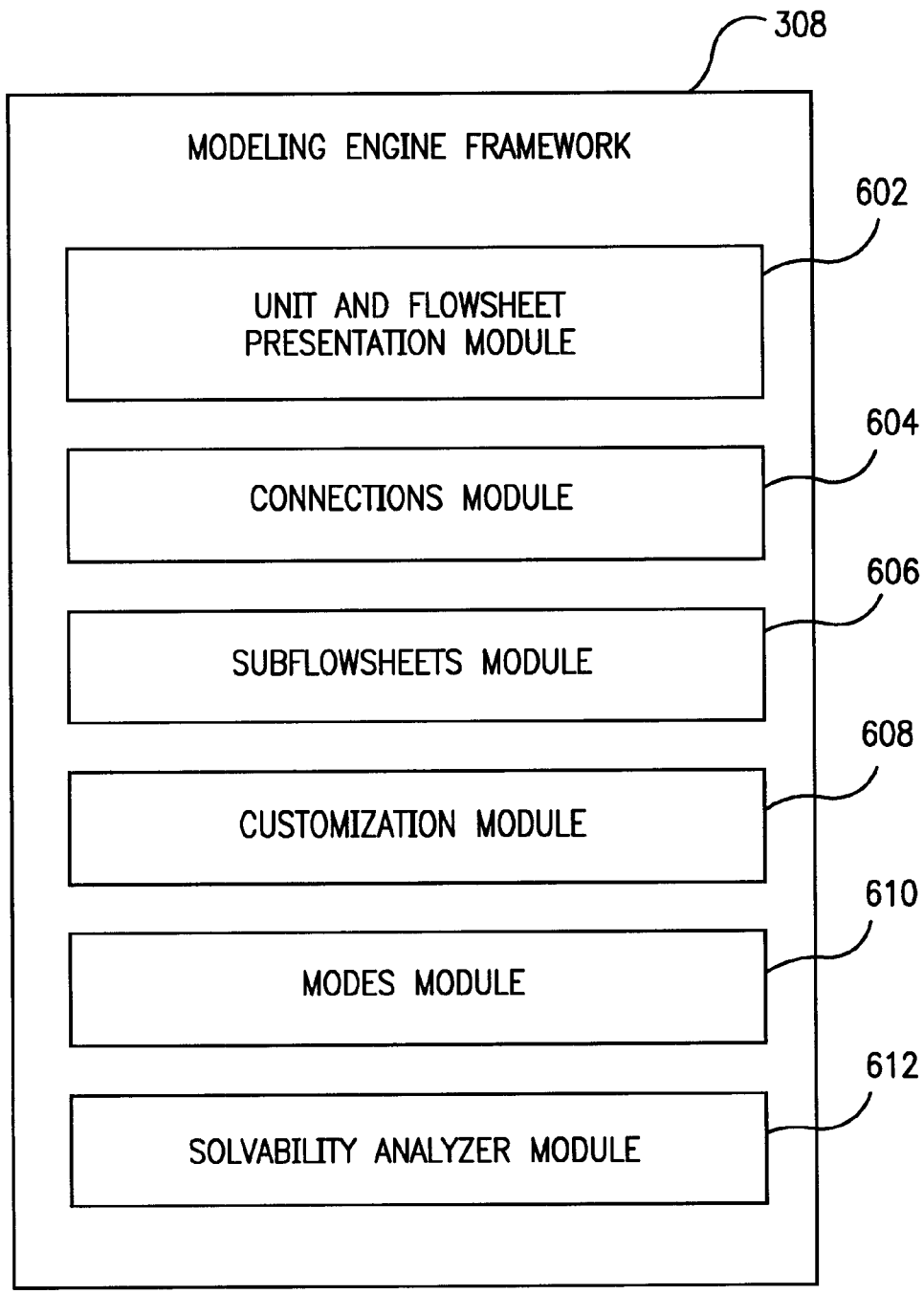
FIG. 6 is a high level block diagram illustrating the architecture of a modeling engine framework.

FIG. 6 further illustrates one embodiment of the modeling engine framework 308. The modeling engine framework 308 comprises a unit and flowsheet presentation module 602, a connections module 604, a subflowsheets module 606, the customization module 608, a modes module 610, and a solvability analyzer module 612. The modeling engine framework 308 interacts with both the GUI 202 and the modeling engine 304, through corresponding module interfaces 204, to present to the user an intuitive environment for creating and modifying unit and flowsheet models.

In one preferred embodiment, the unit and flowsheet presenter 602 works in conjunction with the GUI 202 to facilitate the intuitive presentation of the information and features contained in the modeling engine 304 to the user. This is illustrated generally at 1400 in FIG. 14. For example, color codes, shading, or dashed outlines may be used to indicate the current status, including the solvability status, of a unit or a flowsheet upon the instantiation of a modification to the flowsheet. For example, a name box 1402 of the pump 1202 may appear red, or grayscale in the figure, to indicate the need for user information.

In one embodiment, a unit's independent-fixed variables may be checked to determine if the necessary values for these variables have been supplied. If not, the unit's name box may be colored red to indicate the need for user data. For example, for the pump equation previously given, if the independent-fixed variable PresRise has not been supplied a value, then the pump's name box may be colored red to indicate the need for user data.

In one embodiment, a user is able to continue modifying the flowsheet even though the flowsheet is non-solvable or has errors. This is indicated generally at 1200 in FIG. 12. In FIG. 12, the pump 1202 was instantiated and connected by a connecting stream 1210 even though a source 1208, and as a result the flowsheet, was non-solvable as was indicated by a source name box 1212. Thus, in contrast to existing systems, the user is provided great flexibility in being able to continue building the flowsheet without first making each prior unit instantiation solvable or error free.

In an alternative embodiment, a separate solvability status icon may be implemented in a control panel 1404. The solvability status icon may be a specific color, for example red, to indicate the solvability status of the flowsheet. Moreover, modeling engine features, such as customization and subflowsheet, which are currently inaccessible by the user may have their inaccessibility indicated by a specific color or shading.

In one embodiment, the unit and flowsheet presentation module 602 may organize the modeling engine 304 functions and features into readily identifiable groups. For example, as illustrated by a palette 1406 in FIG. 14, the icons representing the process units may advantageously be grouped together and presented in the GUI 202 window.

Figure 14:
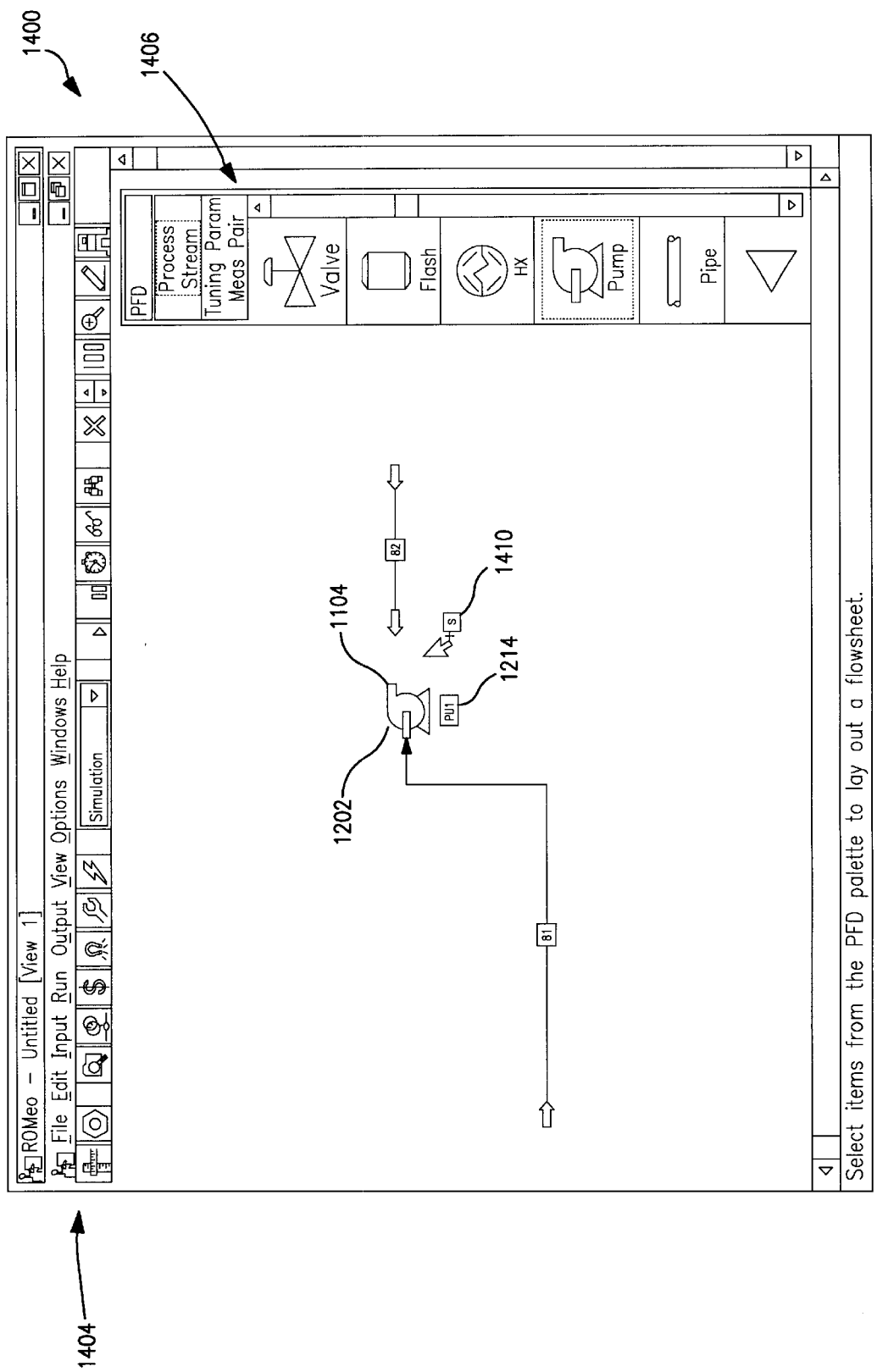
FIG. 14 illustrates one embodiment of a visual indication of error conditions displayed in a GUI.

As illustrated by the exit port 1104 in FIG. 14, in another embodiment, an instantiated unit's ports may be colored red, or grayscale in the figure, to indicate the need for connections to streams once an instance of a stream 1410 is created on the flowsheet. In another embodiment, a unit's unconnected port nearest to the instantiated stream will appear red to suggest a possible stream connection.

Figure 15:
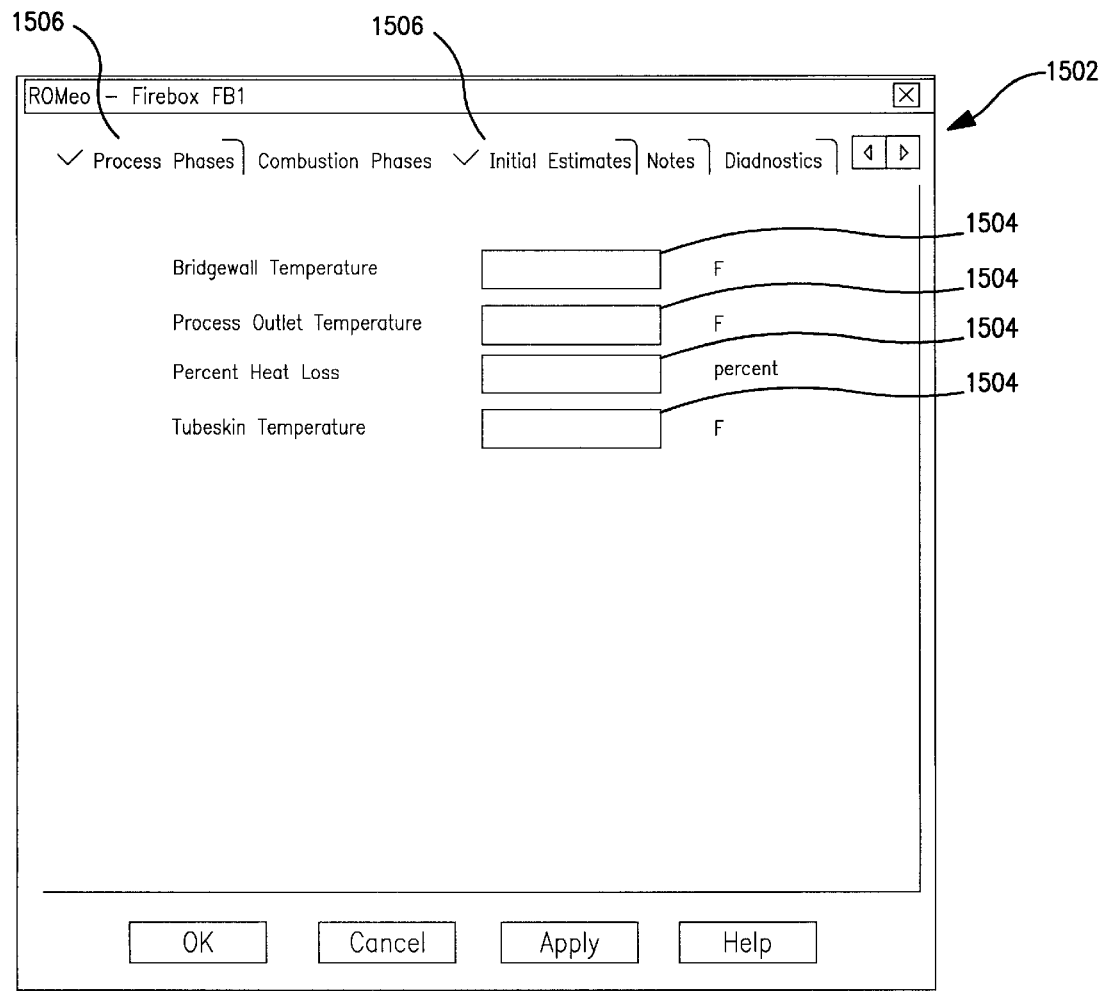
FIG. 15 illustrates one embodiment of a unit data entry window.

In another embodiment, clicking on the instantiated unit using a mouse or the like may permit access to the unit's calculation block as illustrated by a data entry window 1502 in FIG. 15. The data entry window 1502 may implement text prompts or color codes to identify the data the user should supply. For example, a data entry box 1504 may be bordered red, or grayscale in the figure, to indicate the need for user supplied data. In yet another embodiment, a window tab may contain a red check 1506, appearing grayscale in the figure, to indicate the need for user information.

In one embodiment, the connections module 604 provides an environment for the user to correctly utilize streams. The streams are used to connect units. For example, as illustrated by the pump outlet stream 1204 in FIG. 12, a stream may connect two units with compatible ports. Streams may be classified into various types depending on the type of units they connect. In one embodiment, a process stream may connect two process units, whereas a non-process stream may connect two non-process units or may connect a process unit to a non-process unit.

In another embodiment, the connections module 604 may provide a stream's status to a user. For example, a stream not connected at either end may be indicated by a specific shading or color, such as red, thus informing the user of an error condition. In one embodiment, the positioning of the stream's endpoints on the GUI 202 may be used to determine if a connection has been made to a unit's port. If a connection has been made, a logical link may be established between a variable in the stream's model and a variable in the unit's model. In yet another embodiment, non-process streams connecting undefined or non-existent variables may be indicated by a corresponding shading or color indicating the error condition. Regardless of the error condition, the user may advantageously continue modifying the flowsheet.

Figure 16:
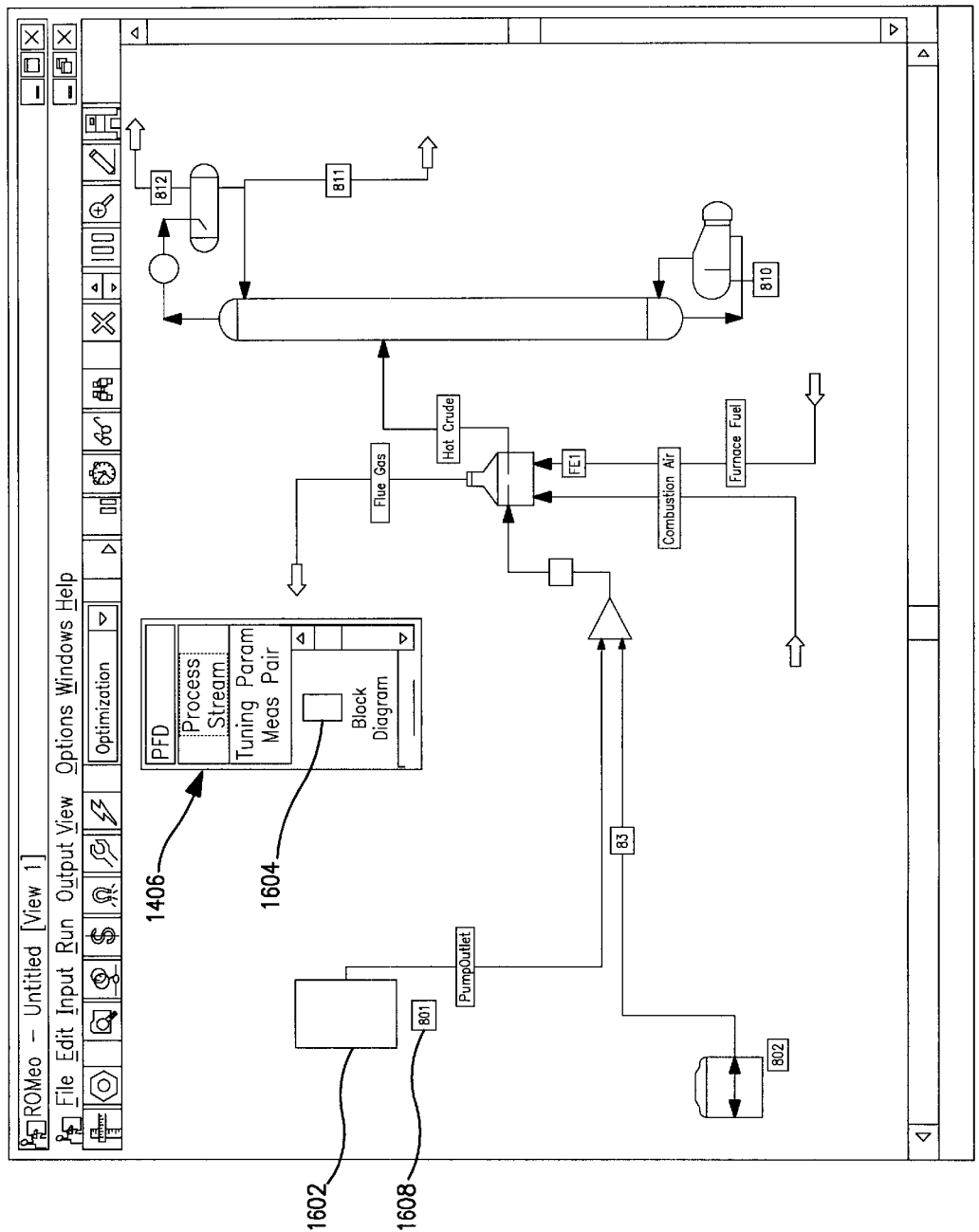
FIG. 16 illustrates another embodiment of a flowsheet model displayed in a GUI.

In one preferred embodiment, the subflowsheets module 606 advantageously allows users to graphically group one or more units into a collection as illustrated by a collection box 1602 in FIG. 16. The collection box 1602 represents a collection of the source 1208, the connecting stream 1210, and the pump 1202 illustrated in FIG. 12. For example, a user would draw a collection border 1216 around the source 1208, the connecting stream 1210, and the pump 1202, using a mouse or the like. The user may then use the mouse or the like to click a block diagram command 1604 on the command palette 1406 to collapse the contents of the border into the collection box 1602.

In one embodiment, the respective models for the source 1208, the stream 1210, and the pump 1202 will be contained in a collection data structure. As further illustrated in FIG. 12, both the source name box 1212 and a pump name box 1214 are colored red, or grayscale in the figure, to indicate the need for user data. Consequently, a collection name box 1608 in FIG. 16 is also red, or grayscale in the figure, to indicate the need for user data.

A user may interactively perform operations on a collection separately from the rest of the flowsheet. For example, rather than deleting units individually from the flowsheet, the user may group the units into a collection and remove the collection from the flowsheet. In one embodiment, the group of units may be collapsible into a single icon representation in order to make better use of the available GUI 202 display space and allowing a larger process to be displayed on a screen. The user may perform operations on the collapsed icon as would be performed on an individual unit.

In one embodiment, the user may expand the icon and display the units and streams contained in the collection. For example, selecting the collection box 1602 and right-clicking on the mouse displays a menu. Then choosing the expand option in the menu displays the source 1208, the connecting stream 1210, and the pump 1202, as illustrated in FIG. 12.

In one preferred embodiment, the customization module 608 permits the user to customize the unit models. Typically, conventional plant process modeling systems consist of a predefined equation or set of equations generally representing the operation of a plant device or unit. The predefined equations may be adequate for modeling a generic plant process, a generic process element, and a standard plant operating condition. In contrast, the customization module 608 allows for the modification to, or extension of, the predefined equations to better represent the operation of an actual device under specific plant conditions. Thus, the user is able to enhance the modeling of a plant process. For example, a unit model may be customized to more accurately reflect the operation of the specific plant device or unit by including variables and equations representing empirical plant data. Furthermore, a user can include proprietary modeling information in addition to, or in place of, standard equations.

Figure 7:
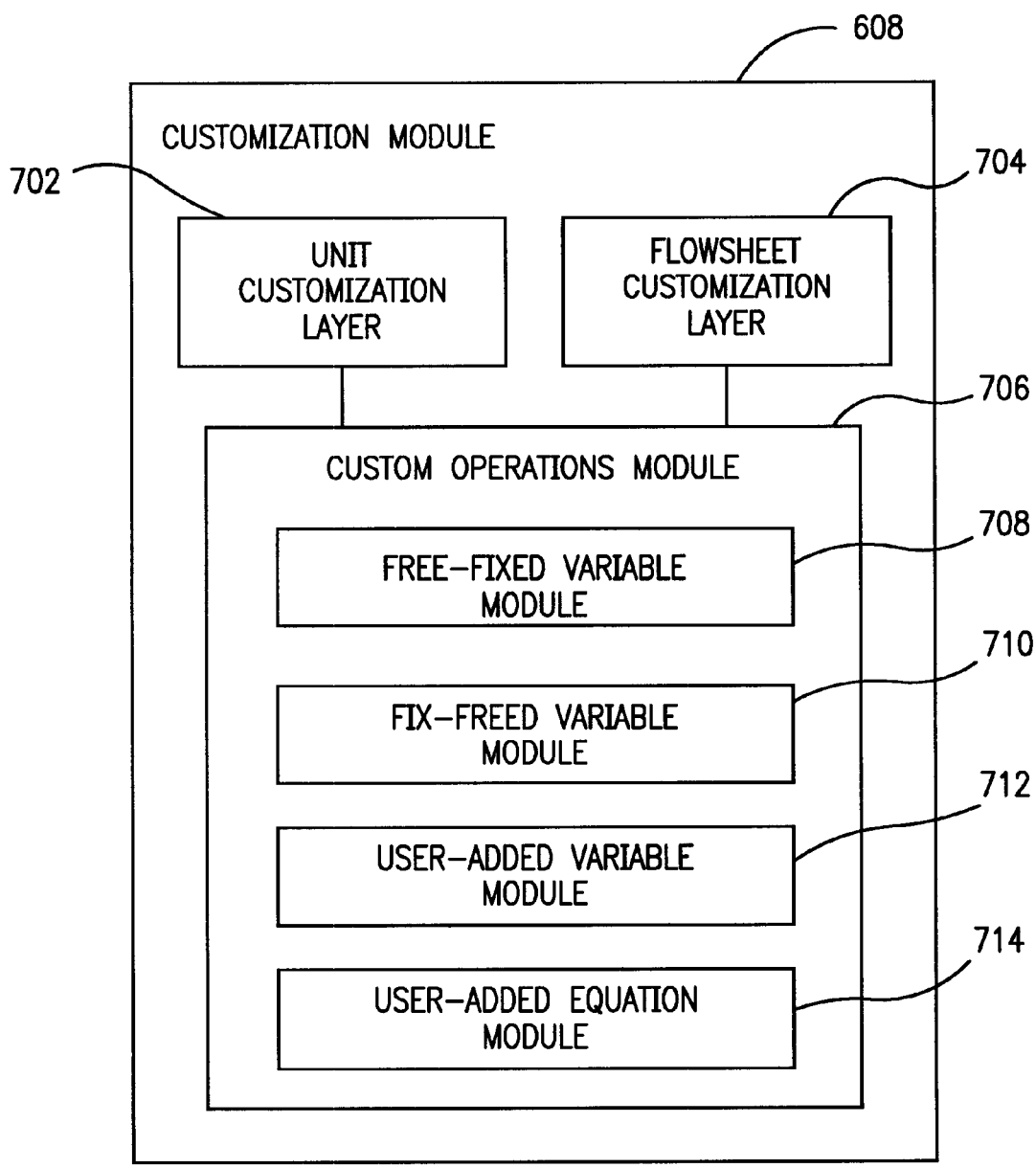
FIG. 7 is a high level block diagram illustrating the architecture of a customization module.

As detailed in FIG. 7, the customization module 608 comprises a unit customization layer 702 and a flowsheet Customization layer 704. As further detailed in FIG. 7, the unit customization layer 702 or the flowsheet customization layer 704 may access a custom operations module 706. The custom operations module 706 includes a free-fixed variable module 708, a fix-freed variable module 710, a user-added variable module 712, and a user-added equation module 714.

Through the unit customization layer 702, a user may perform custom operations on a unit-by-unit basis. For example, in the previous pump equation, the user may make the independent-fixed variable PresRise dependent. The user also may make the dependent variable Head independent-fixed in the same pump equation. The unit customization layer 702 may provide user access to a selected unit model. Thus, in contrast to existing systems, the user may interactively and advantageously customize unit models and stream models to enhance the analysis of a process model. Also in contrast to existing systems, the user may determine a unit's input value by providing the unit's output value. The flowsheet model may be solved in open-equation or open-form mode.

In one embodiment, the custom operation may be a part of the selected unit model alone, thus permitting an analysis of the status of the selected unit model. This analysis may be performed to determine whether a change in the absolute number of the degrees of freedom in the selected unit model has occurred. For example, if the number of variables made independent and the number of new equations added do not equal the number of variables made dependent and the number of new variables added, then a change in the ratio has occurred. If the number of variables made independent and the number of new equations added are less than the number of variables made dependent and the number of new variables added, then the user has created additional degrees of freedom.

In one embodiment, the unit customization layer 702 may be implemented in the following manner, thereby providing access to the selected unit:

the user uses a pointing device such as a mouse or the like to select a unit, such as a pump, mixer, or splitter, or a stream in the flowsheet;

the user right-clicks on the mouse to reveal a menu, and chooses "customization" from the menu, in response, the unit customization layer causes a customization window to appear, displaying the variables and equation names associated with the unit or stream.

In one embodiment, the flowsheet customization layer 704 enables user access to the flowsheet units and streams rather than at one unit or stream at a time as with the unit customization layer 702. The user may access the custom operation module 706 through the flowsheet customization layer 704 and establish relationships between different units and streams. For example, in FIG. 12, a valve may be connected to the connecting stream 1210. The valve may adjust the amount of feed pressure input to the pump 1202. The valve may be associated to a measurement connected to a mixer outlet stream 1218. Thus, depending on the measurement, the user may accordingly adjust the valve to reduce or increase the feed pressure. In conventional modeling systems, the user sets the valve, measures the mixer output, and then loops back to adjust the valve depending on the mixer output measurement. Thus, in contrast to conventional modeling systems, this invention advantageously provides the user the capability to adjust an input variable without looping back. Furthermore, in contrast to conventional systems which solved the flowsheet in sequential modular or closed-form, this invention advantageously allows the flowsheet model to be solved in open-equation mode.

In accordance with one embodiment of this invention, a user may customize the flowsheet units and streams to better fit actual data associated with a plant process and thus, better model the plant process. The customized flowsheet may be used in multiple applications in open-equation mode. For example, the plant process data may be incorporated into the model in real time, as the plant process is executing. The results of the plant process modeling application are incorporated back into the plant controls in real time. The real time interaction may be accomplished through the use of a common data storage mechanism, such as a database or the like. Details on real time scheduling, modeling, and analyzing process systems are included in the co-filed applications entitled METHOD AND SYSTEM FOR A GRAPHICAL REAL TIME FLOW TASK SCHEDULER and PROCESS MODEL GENERATION INDEPENDENT OF APPLICATION MODE filed on even date herewith and which are hereby incorporated by reference in their entirety.

In one embodiment, the relationship between different units and streams may be implemented by creating logical connections between the units and streams. The logical connections may be implemented by a pointer entry in the unit's and stream's multi-dimensional data structures. For example, an entry in the multi-dimensional data structure for the valve may contain a pointer which addresses the appropriate measurement variable location in the measurement's multi-dimensional data structure.

In another embodiment, links may be created between flowsheet model elements and external databases. For example, a flowsheet model variable may be linked to an external database location. The variable's value location within the flowsheet model may be implemented as a pointer. This pointer may contain a location address in the external database.

In one embodiment, once the link is established, data may be transferred in both directions. For example, the flowsheet variable may obtain its value from the external database as well as write its value into the external database. Thus, this invention provides the user great flexibility by permitting interaction with systems external to the plant modeling system.

In one embodiment, the flowsheet customization layer 704 may be implemented in the following manner, thereby providing user access to the flowsheet units and streams:

the user uses a pointing device to drag-and-drop a "customization" icon onto the flowsheet;

the user double-clicks on the "customization" icon;

the customization window appears, displaying the units and streams contained in the flowsheet using a hierarchical tree;

the user clicks on a displayed unit or stream to display the variables and equation names associated with the unit or stream.

Figure 18:
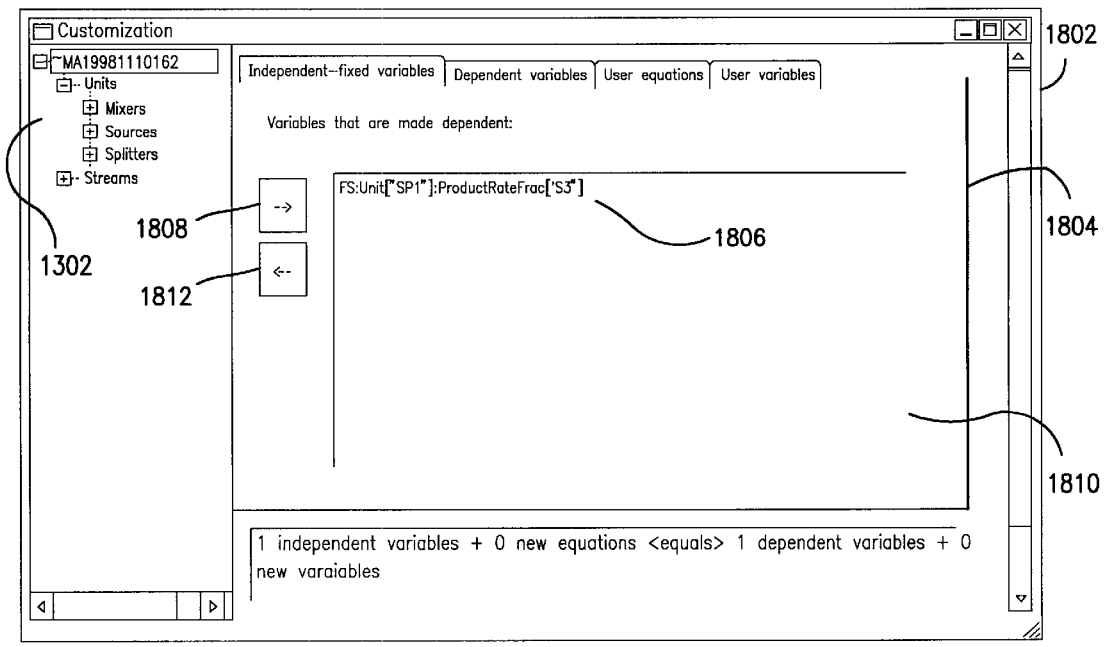
FIG. 18 illustrates one embodiment of a dependent variables window.

In one embodiment, the free-fixed variable module 708 may be initiated via a tab accessible from a customization window 1802. The free-fixed variable module 708 is used to free a variable that is currently fixed. In one embodiment, the user may select a fixed variable from an expanded hierarchical tree. Then the user may click a button, such as an arrow button, to free the selected variable and add it to a list of dependent variables. For example, FIG. 18 illustrates the customization window 1802 displaying a dependent variables window 1804. A rate fraction variable 1806 was previously a fixed variable appearing in the listing 1302. A user selected this fixed variable when it appeared in the listing 1302 and clicked an input arrow button 1808, thus freeing the rate fraction variable 1806 and making it appear in a freed variables window 1810. Alternatively, the user may now click an output arrow button 1812 to un-free the rate fraction variable 1806.

Figure 19:
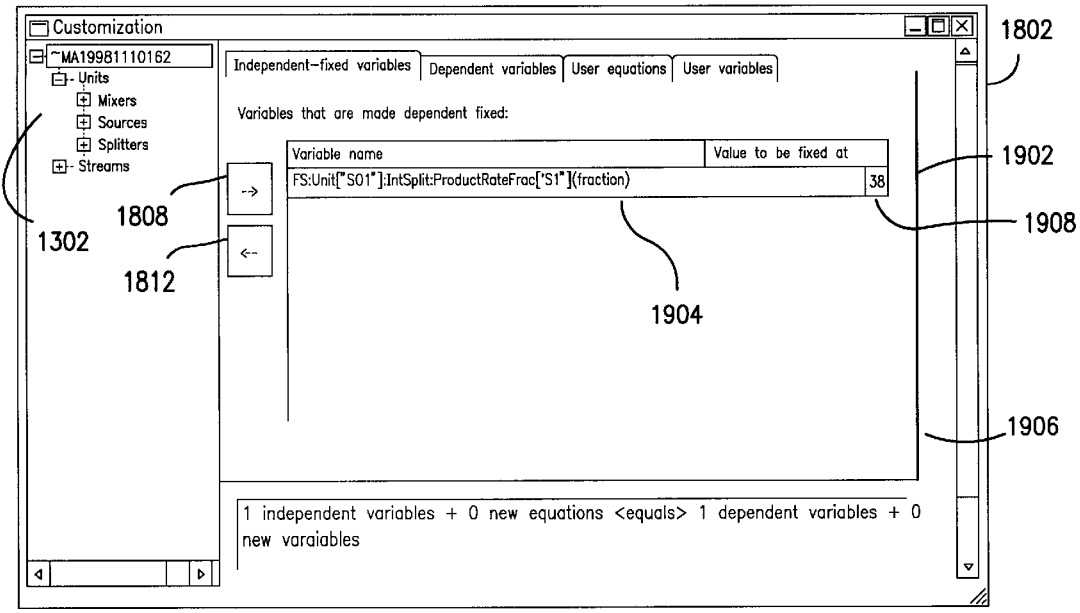
FIG. 19 illustrates one embodiment of an independent variables window.

In another embodiment, the fix-freed variable module 710 may also be initiated via a tab accessible from the customization window 1802. The fix-freed variable module 710 is used to fix a calculated variable that is currently free. In one embodiment, the user may select a free variable from the expanded hierarchical tree. The user may then click a button, such as an arrow button, to fix the selected variable and add it to a list of fixed variables. The user may then enter a value for the variable just added to the list. For example, FIG. 19 illustrates the customization window 1802 displaying an independent variables window 1902. A fraction variable 1904 was previously a free variable appearing in the listing 1302. A user selected this free variable when it appeared in the listing 1302 and clicked the input arrow button 1808, thus making the fraction variable 1904 appear as an entry in a fixed variables window 1906. The user may then enter a variable value 1908, thus supplying a value to the fraction variable 1904. Alternatively, the user may now click the output arrow button 1812 to un-fix the fraction variable 1904.

Figure 20:
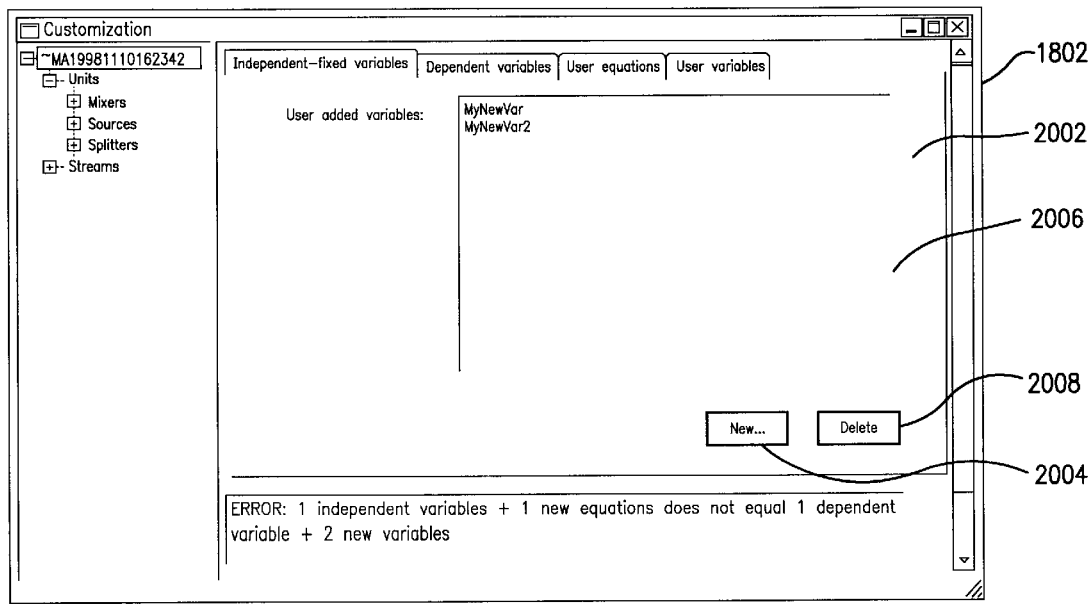
FIG. 20 illustrates one embodiment of a user variables window.
Figure 21:
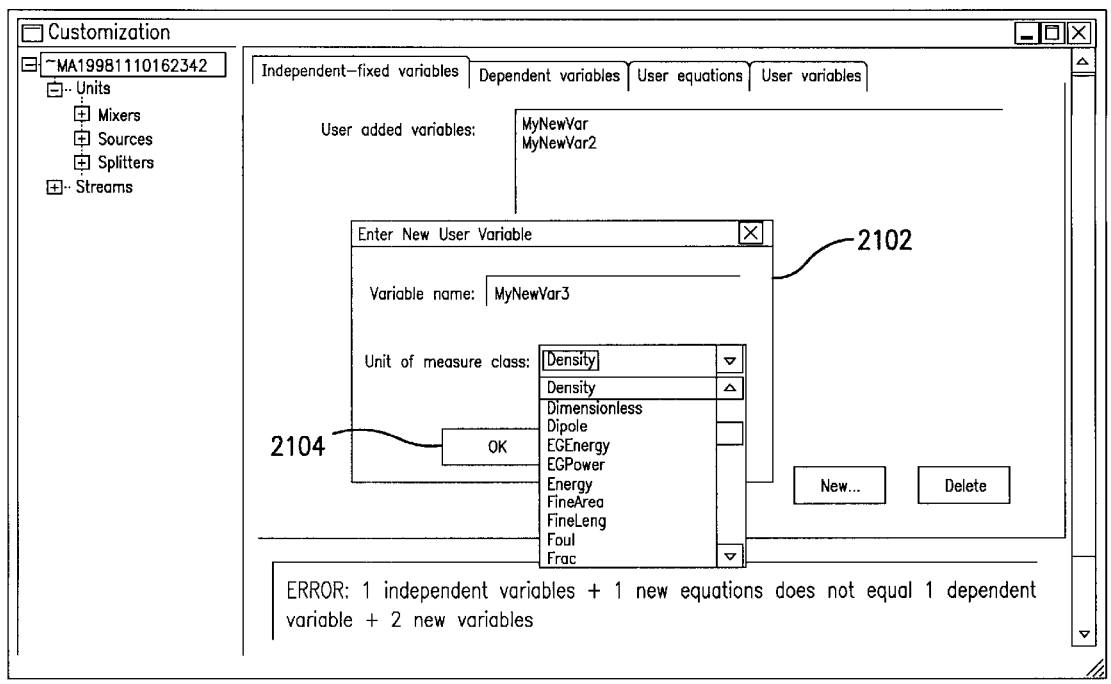
FIG. 21 illustrates one embodiment of a new variable entry window.

In still another embodiment, the user-added variable module 712 may likewise be initiated through a tab accessible from the customization window 1802. The user-added variable module 712 is used to define custom variables for use in a user equation. For example, FIG. 20 illustrates the customization window 1802 displaying a user variables window 2002. In one embodiment, the user may click a new button 2004 displaying an enter new user variables window 2102 illustrated in FIG. 21. The user may then proceed to enter a user variable and its unit of measure as depicted generally in FIG. 21. The user then clicks an OK button 2104 to add the user variable and display it in a user added variables window 2006. As illustrated in FIG. 13, the user added variable is displayed in the listing 1302 below the user added variables button 1304. Alternatively, the user may now select an entry appearing in the user added variables window 2006 and click a delete button 2008 to remove the selected entry.

Figure 22:
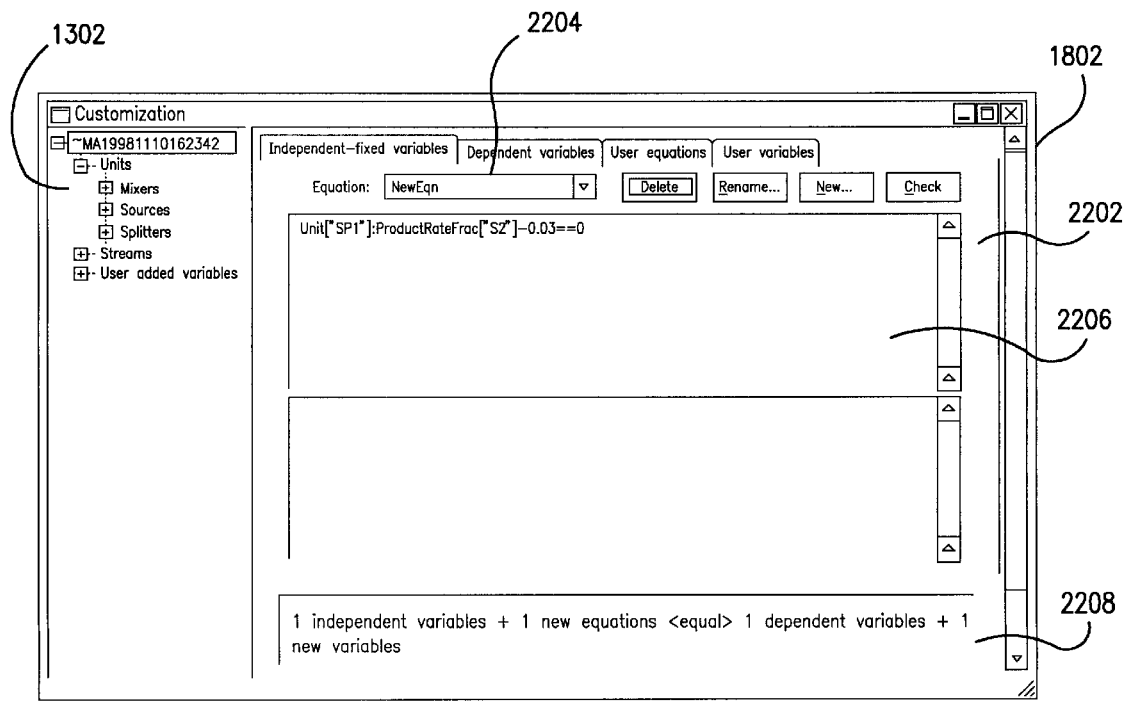
FIG. 22 illustrates on embodiment of a user equations window.

In yet another embodiment, the user-added equation module 714 may be accessed via a customization window tab. The user-added equation module 714 is used to create a custom equation. The custom equation may be used in defining a flowsheet unit or stream. For example, FIG. 22 illustrates the customization window 1802 displaying a user equations window 2202. In one embodiment, the user may create a custom equation by clicking a new button (not displayed in the figure) displaying an equation name box

2204. The user may then enter a name for the custom equation in the equation name box 2204 and click an OK button (not displayed in the figure) to save the name to a database and display the name in an equation display window 2206. The user may create the custom equation by clicking-and-dragging variables appearing in the list 1302 into the equation display window 2206. Moreover, the user may also directly enter the custom equation, or parts thereof, using a keyboard or the like. The user may then hit a save equation button (not shown in the figure), thus including the custom equation in the unit or flowsheet model.

In another embodiment, the user may perform various operations on flowsheet equations. For example, the user may display multiple equations in the equation display window 2206. The user may proceed to perform operations, such as delete, rename, and the like, on the equations appearing in the equation display window 2206. In one embodiment, the user may selectively choose a subset of the equations appearing in the equation display window, and perform operations on the subset.

In another embodiment, a customization status box 2208 informs the user of any increase in the flowsheet's number of degrees of freedom. As previously stated, if the number of variables made independent and the number of new equations added are less than the number of variables made dependent and the number of new variables added, then the user has created additional degrees of freedom. This status is indicated after each user customization operation. Thus, this invention advantageously informs the user of the increased degrees of freedom upon their creation. Furthermore, this invention advantageously allows a customized flowsheet model to be solved in open-equation mode.

In one preferred embodiment, the modes module 610 may provide one or more flowsheet calculation modes, such as simulation, data reconciliation, and optimization, used to accomplish different solution objectives. Each calculation mode may be independent of the other, and may provide a complete, solvable problem specification. In one embodiment, there may only be one calculation mode selected when solving a flowsheet.

One embodiment of the present invention utilizes three applications providing three corresponding modes of calculation. These modes include simulation, data reconciliation, and optimization.

Simulation is an application where an outcome is calculated by solving a set of equations where all the degrees of freedom were specified by a user. Simulation is typically used to generate models of new or existing processes to approximate the process operation. Simulation typically functions as a design tool.

Data Reconciliation is an application where the objective is to determine values of variables of a set of equations which minimize the deviations between plant measurements and the variable values determined by the set of equations. Data Reconciliation starts with a premise that plant data is always in error. Data Reconciliation typically converts the contaminated data to usable information by estimating the true values of the measured variables.

Optimization is an application where some of the degrees of freedom have been left unspecified, to be determined by an algorithm which may minimize or maximize a user-specified equation. Optimization typically involves the process of finding a set of conditions which achieve the best economic result for a given plant process.

In one embodiment, a single flowsheet model or representation may be seamlessly used in multiple applications. For example, a class macro may be used to alter the status of flowsheet variables, thereby providing a seamless switching between modes using the single flowsheet model. A class macro may consist of a series of operations on each type of unit model or stream model, such as streams, pumps, and measurements, in the flowsheet, rather than each instance of a unit model or a stream model.

For example, in one embodiment, there may be three separate macros, one each for simulation, data reconciliation, and optimization, for a measurement unit. The previously stated measurement equation is:

$$ModelVariable-Scan-Offset=0.$$

The measurement unit may be associated with the following measurement class macros in the simulation, data reconciliation, and optimization calculation modes:

SpecMacroSim (Simulation Macro)
{
   FixVariable ModelVariable;
   FreeVariable Scan;
   FixVariable Offset;
}
SpecMacroDataRec (Data Reconciliation Macro)
{
   FreeIndVariable ModelVariable;
   FixVariable Scan;
   FreeVariable Offset;
}
SpecMacroOpt (Optimization Macro)
{
   FixVariable ModelVariable;
   FreeVariable Scan;
   FixVariable Offset;
}

Executing the corresponding measurement macro for each calculation mode seamlessly and appropriately sets the measurement variables status for proper math model generation by the model generator 502. For example, executing either the SpecMacroSim macro or SpecMacroOpt macro sets both ModelVariable status and Offset status to independent-fixed, and Scan status to free. Executing the SpecMacroDataRec macro sets ModelVariable status to independent-free, Scan status to independent-fixed, and Offset status to free. Thus, the present invention advantageously enables a user to seamlessly and interactively achieve the desired flowsheet calculation mode using the same flowsheet representation.

In another embodiment, the user may create custom macros which alter the status of flowsheet variables. The user may use the custom macros to customize one or more flowsheet variables. The user may create a custom macro to appropriately set a status of a user defined variable. Thus, the same user customized flowsheet model may be seamlessly used in multiple applications.

In one embodiment, the selection of a given calculation mode is accomplished using a calculation mode pull-down menu 1220 illustrated in FIG. 12. The calculation mode pull-down menu 1220 specifies the calculation modes. The user selects a desired calculation mode by selecting and clicking on the desired calculation mode with a mouse or other such device. In one embodiment, the class macros for the calculation mode are automatically executed upon such selection. The class macros set the status of certain variables contained in each of the flowsheet unit models or stream models in order to solve or converge the flowsheet model in the selected calculation mode.

In an another embodiment, the solvability analyzer module 612 continuously determines the solvability status of the unit and flowsheet model by determining the number of degrees of freedom. Typically, the number of variables in a unit model exceeds the corresponding number of equations. However, the number of variables should equal the number of equations in order for a set of equations to be solvable. Thus, there should be zero degrees of freedom for a process unit's calculation block, and the resulting flowsheet, to be solvable. Alternatively, excess degrees of freedom should be accounted for in order to be solvable. In the present invention, the user may create a custom equation using the user-added equation module 714. The custom equation may remove the number of degrees of freedom, thereby allowing the flowsheet to be solved.

In one embodiment, the solvability analyzer 612 is executed upon a change to the flowsheet. The solvability analyzer 612 may keep a current count of both the independent-free variables and the equations. For example, a table may be used to contain the number of independent-free variables and the number of equations. This value may be updated appropriately according to the change made to the flowsheet.

Figure 8:
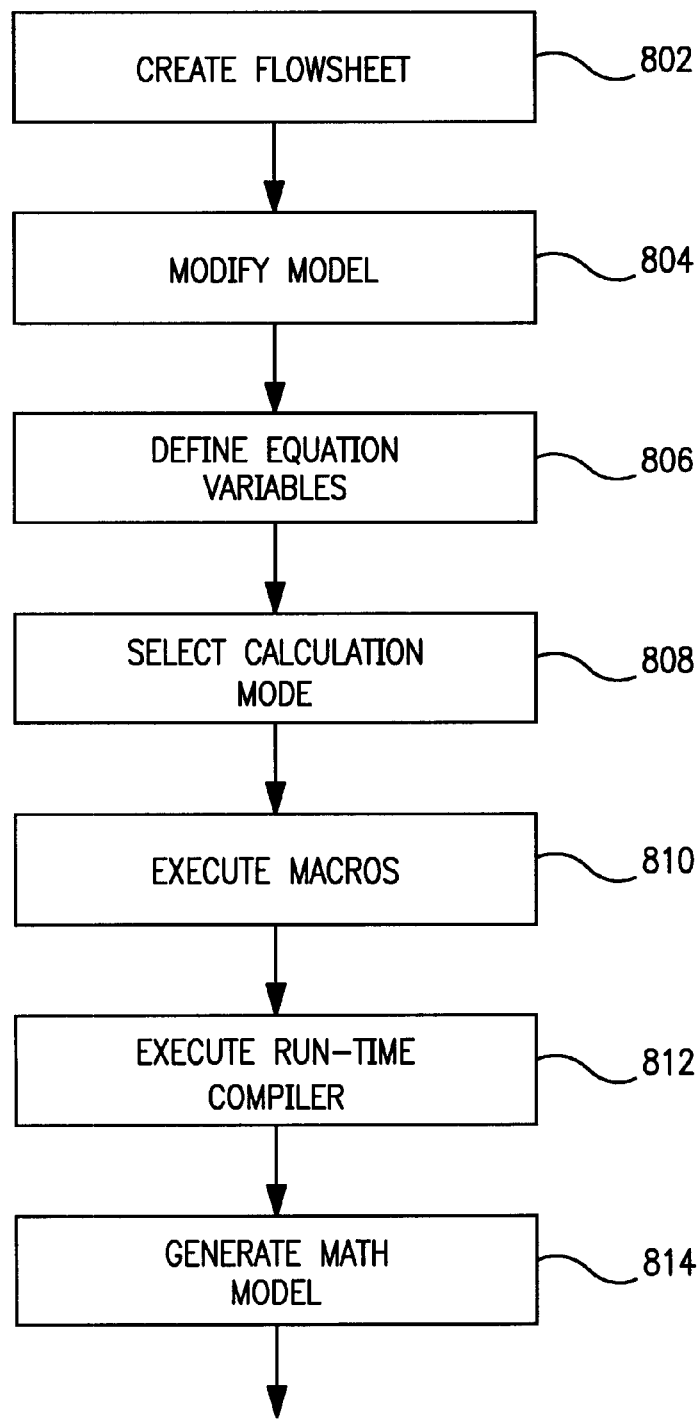
FIG. 8 is a high level block diagram illustrating a math model generating process of a process modeling system in accordance with a one embodiment of the present invention.

FIG. 8 illustrates one example of generating a math model in one embodiment of the invention. In a create flowsheet step 802, a user utilizes the GUI 202 to create a flowsheet model. The user instantiates one or more units, such as a pump, a mixer, a stream, or the like, onto a flowsheet window presented by the GUI 202 and depicted generally at 1000 in FIG. 10. The user instantiates streams onto the flowsheet window and connects the units to one another. The user may then proceed to invoke a data entry window for each element on the flowsheet and enter the requested data.

In a modify model step 804, the user modifies a unit model or stream model currently contained in the flowsheet. The user invokes the free-fixed variable module 708, the fix-freed variable module 710, the user-added variable module 712, or the user-added equation module 714. For example, the user may add an equation to the unit through the user-added equation module 714. The user-added equation may be invoked through either the unit customization layer 702 or the flowsheet customization layer 704. The user may then define the variables for the unit models and stream models contained in the flowsheet in a define equation variables step 806. The user may modify multiple unit models and stream models. Furthermore, the user may repeatedly make modifications to each unit model and stream model.

The user then selects the calculation mode for the flowsheet model in a select calculation mode step 808. The class macros, as well as the user created custom macros, are executed to set the context of the flowsheet in an execute macros step 810. Upon execution of all the macros, the run-time compiler 510 may be invoked in an execute run-time compiler step 812. The run-time compiler 510 may create an instance library from the modified unit models and the modified stream models.

In a generate math model step 814, the model generator 502 uses the standard library 508 and the just created instance library 512 to create a math model. The created open-equation math model is presented to the solution engine 310 for solving or converging the set of equations contained in the math model.

Figure 9:
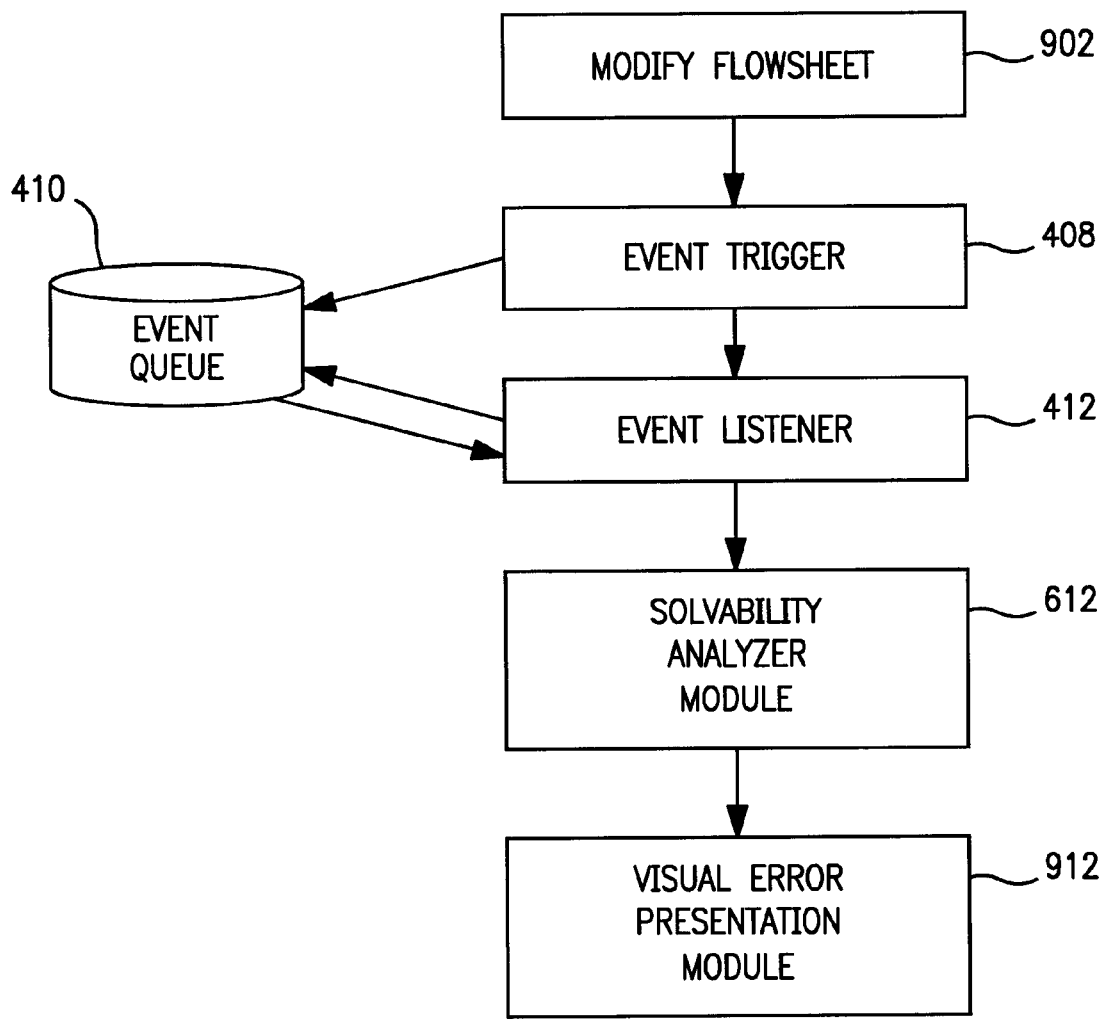
FIG. 9 is a high level block diagram illustrating one embodiment of the interaction between an event handler and a solvability analyzer module.

FIG. 9 illustrates one example of an interaction between the event handler 406 and the solvability analyzer module 612 in one embodiment of the present invention. In a modify flowsheet step 902, a user may modify a flowsheet. For example, the user may delete an instance of a unit from the flowsheet by invoking the unit and flowsheet presentation module 602. The flowsheet modification invokes the event trigger 408. The event trigger 408 queues up the flowsheet modification into the event queue 410. Typically, the event queue 410 is a data storage mechanism, such as a hard disk, implemented as a first-in-first-out queue.

The event listener 412 monitors the event queue 410 to determine if any flowsheet modifications have occurred. The event listener 412 may sequentially remove each flowsheet modification from the event queue 410 and perform the necessary operations on the flowsheet to maintain the consistency of the flowsheet model. For example, if a variable is deleted from a unit model, all references in the flowsheet model to the variable may be removed. The event listener 412 may invoke the solvability analyzer module 612 after performing each flowsheet modification.

The solvability analyzer 612 may determine the solvability status of the flowsheet model as well as the unit models and stream models which were affected by the flowsheet modification. A visual error indication module 912 causes the solvability status of the unit, stream, and flowsheet models to be visually indicated. The visual error presentation module 912 may utilize the GUI 202 to visually indicate any error condition to the user. For example, an incorrectly connected unit and stream may be indicated by a red color. Alternatively, the visual error presentation module may be the unit and flowsheet presentation module 602.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A method for creating a process flowsheet model representative of a physical process effected by one or more devices, said method comprising:

instantiating an instance of a first unit model as part of said flowsheet model, said first unit model being representative of at least one or more physical aspects of operation of a first device;

displaying at least one predefined model equation associated with said first unit model in response to a user command, said at least one predefined model equation including a parameter indicative of a measured value of at least one of said physical aspects;

receiving a user modification of said at least one equation; and determining a solvability state of said flowsheet model in open-equation form.

2. The method as defined in claim 1, wherein a user points at said instance of said first model using a pointing device and clicks a pointing device button to issue said user command.

3. The method as defined in claim 1, wherein said user modification act includes changing a state of a variable associated with said equation from free to fixed.

4. The method as defined in claim 1, wherein said user modification act includes changing a state of a variable associated with said equation from fixed to free.

5. The method as defined in claim 1, wherein said user modification act includes changing a state of a variable associated with said equation.

6. The method as defined in claim 1, wherein said first unit model is a model of at least one portion of a plant process.

7. The method of claim 1, further comprising the act of accepting a user supplied equation.

8. The method of claim 1, further comprising the acts of:
instantiating an instance of a second unit model as part of said flowsheet model, said second unit model being representative of at least one or more physical aspects of operation of a second device; and
receiving a user supplied link which links a first variable associated with said first unit model with a second variable associated with said second unit model.

9. A modeling system for creating a process model representative of a physical process effected by one or more devices, said modeling system comprising:
an editing system used to design said process model, said editing system providing at least one symbolic representation of a process unit having at least one user alterable equation, said process unit being representative of at least one or more physical parameters relating to operation of a first device wherein said at least one user alterable equation includes a variable relating to a measured value of at least one of said physical parameters; and
a window which displays said user alterable equation in response to a user operation.

10. The modeling system as defined in claim 9, further comprising an instantiation of said first unit model and a second unit model, wherein said first unit model is associated with at least one variable linked by a user to a variable associated with said second unit model and wherein said second unit model is representative of at least one or more physical parameters relating to operation of a second device.

11. The modeling system as defined in claim 9, further comprising a degrees-of-freedom indicator which indicates the number of degrees of freedom for said process model to a user.

12. The modeling system as defined in claim 9, wherein said user operation is a point and click operation.

13. A user-accessible design module used to design process models representative of physical processes effected by sets of devices, said module stored on a computer readable memory, said module comprising:
a design area configured to receive a user entry, including at least an instantiation of at least a first unit model having a user alterable definition wherein said first unit model is representative of at least one or more physical parameters relating to operation of a first device an wherein said user entry defines at least a portion of a process model;
an input stream and an output stream in communication with said first unit model, said input stream being representative of a first physical flow and said output stream being representative of a second physical flow;
a first variable associated with said input stream and a second variable associated with said output stream;
a user interface used to allow the user to free said first variable and fix said second variable based upon measurement of a first of said physical parameters wherein said first of said physical parameters is associated with said second physical flow; and
a solver system configured to determine a value of said first variable.

14. The design module as defined in claim 13, further comprising a window used to accept at least a user supplied equation.

15. The design module as defined in claim 13, wherein said first unit model represents a pump.

16. A method of analyzing a process model representative of a physical process effected by one or more devices, said method comprising:
fixing at least one output variable associated with said process model, said at least one fixed output variable being representative of a measured value of a physical output of a first of said devices;
freeing at least one input variable associated with said process model; and
calculating a value of said at least one input variable based at least partially on said at least one fixed output variable.

17. The method as defined in claim 16, wherein said process model includes a first unit model which represents at least one hardware item and a second unit model which represents at least one stream.

18. The method as defined in claim 16, wherein said calculation is performed by an open form equation solver.

19. The method as defined in claim 16, wherein said output variable is freed in response to a user input.

20. The method as defined in claim 16, wherein said input variable is fixed in response to a user input.

21. The method as defined in claim 16, further comprising the acts of:
calculating the number of degrees of freedom for said process model; and
reporting said number to a user.

22. A design system used to design process models representative of physical processes effected by sets of devices, said design system comprising:
a means for receiving a user entry, including at least an instantiation of at least a first unit model wherein said first unit model is representative of at least one or more physical parameters relating to operation of a first device wherein said user entry defines at least a portion of a first of said process models;
a means for selectively freeing and fixing equation variables associated with said first unit model, at least one of said equation variables being fixed based upon a measured value of a first of said one or more physical parameters; and
a means for reporting said solvability state to a user, wherein said means for receiving a user entry is configured to accept the instantiation of a second unit model at least while said means for reporting reports that said first process model is not solvable, said second unit model being representative of at least one or more physical parameters relating to operation of a second device.

23. A system for analyzing a process plant comprised of a plurality of devices, said system comprising:
a computer system used to execute process modeling routines;
a storage system which stores process modeling information utilized by said process modeling routines wherein said process modeling information is representative of operation of said plurality of devices, said storage system coupled to said computer system;
a process model editing routine configured to be executed by said computer system, wherein said process model editing routine is used to provide at least one symbolic representation of at least a portion of said process modeling information from said storage system, said symbolic representation having at least one associated model equation based at least in part upon a measured value of a physical parameter relating to said operation of said plurality of devices; and
a window configured to display said model equation for user modification in response to a user operation.

24. A server unit for analyzing a process model representative of a plurality of devices collectively operative to effect a physical plant process, said server unit comprising:

a modeling engine defining a plurality of unit models representative of physical operation of corresponding ones of said plurality of devices, said modeling engine generating said process model;

a solver module for providing and executing a solution algorithm for solving said process model; and a modeling engine framework for providing user access to said modeling engine, said modeling engine framework enabling user modification of a model equation associated with a first of said plurality of unit models wherein said model equation is based at least in part upon a measured value relating to said physical operation.

25. The server unit of claim 24 wherein said modeling engine includes a flowsheet manager and an event handler.

26. The server unit of claim 24 wherein said modeling engine further includes an additional plurality of unit models representative of a corresponding plurality of non-process units and wherein a first of said non-process units corresponds to a penalty weighting associated with a parameter of said plant process.

27. The server unit of claim 24 wherein said modeling engine further defines a plurality of stream models representative of a corresponding plurality of streams of physical media interconnecting said plurality of devices.

28. The server unit of claim 27 wherein said modeling engine framework enables user alteration of at least one equation associated with a first of said stream models.

29. The server unit of claim 27 wherein a first equation including a plurality of variables is associated with a first of said stream models, said modeling engine framework enabling user identification of ones of said plurality of variables as at least dependent, independent-fixed and independent-free.

* * * * *